(12) United States Patent
Ooi et al.

(10) Patent No.: US 8,213,798 B2
(45) Date of Patent: Jul. 3, 2012

(54) OPTICAL TRANSMISSION APPARATUS, WAVELENGTH DIVISION MULTIPLEXING OPTICAL COMMUNICATION SYSTEM AND OPTICAL TRANSMISSION METHOD

(75) Inventors: Hiroki Ooi, Kawasaki (JP); Hiroshi Onaka, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 366 days.

(21) Appl. No.: 12/688,137

(22) Filed: Jan. 15, 2010

(65) Prior Publication Data
US 2010/0221013 A1    Sep. 2, 2010

Related U.S. Application Data

(63) Continuation of application No. PCT/JP2007/064366, filed on Jul. 20, 2007.

(51) Int. Cl.
*H04J 14/02* (2006.01)

(52) U.S. Cl. .......... 398/81; 398/147; 398/192; 398/193; 398/194; 398/183; 398/185; 398/186; 398/188; 398/158; 398/159; 398/79; 398/135; 398/136; 398/24; 398/37

(58) Field of Classification Search .................... 398/81, 398/147, 183, 185, 186, 188, 79, 192, 193, 398/148, 149, 150, 158, 159, 74, 75, 161, 398/194, 200, 201, 202, 208, 209, 214, 135, 398/136, 139; 385/24, 37, 15, 27
See application file for complete search history.

(56) References Cited

U.S. PATENT DOCUMENTS

| 7,373,040 | B2 * | 5/2008 | Cai et al. ..................... 385/24 |
| 7,512,345 | B2 * | 3/2009 | Yamada ...................... 398/147 |
| 7,609,969 | B2 | 10/2009 | Vassilieva et al. |
| 2003/0170028 | A1 | 9/2003 | Mori et al. |

FOREIGN PATENT DOCUMENTS

| JP | 8-125605 | 5/1996 |
| JP | 2003-224521 | 8/2003 |
| JP | 2005-79826 | 3/2005 |
| JP | 2007-174659 | 7/2007 |
| WO | WO2002/035665 | 5/2002 |

OTHER PUBLICATIONS

G. Charlet, et al., "Nonlinear Interactions Between 10Gb/s NRZ Channels and 40 Gb/s Channels with RZ-DQPSK or PSBT Format over Low-Dispersion Fiber" Mo. 3.2.6, ECOC2006.
English language International Search Report for PCT/JP2007/064366, mailed Sep. 18, 2007.

* cited by examiner

*Primary Examiner* — Hanh Phan
(74) *Attorney, Agent, or Firm* — Staas & Halsey LLP

(57) ABSTRACT

An optical transmission apparatus for suppressing deterioration of transmission quality due to XPM in a wavelength division multiplexing optical communication system in which an intensity modulation optical signal and a phase modulation optical signal exist in a mixed form. The apparatus has an intensity inversion signal light output section which outputs light having an intensity pattern obtained by inverting intensity changes of the intensity modulation optical signal near a wavelength of the intensity modulation optical signal in arrangement on wavelength axis of optical wavelengths that can be multiplexed as a wavelength division multiplexed signal as intensity inversion signal light, and a wavelength division multiplexed optical signal output unit which wavelength-division-multiplexes the intensity modulation optical signal, the phase modulation optical signal and light from the intensity inversion signal light output section and outputs a wavelength division multiplexed optical signal.

10 Claims, 18 Drawing Sheets

10G SIGNAL CHANNEL
(CHANNEL FOR
SENDING INFORMATION)
Ch#2

10G INTENSITY INVERSION
SIGNAL CHANNEL
(CHANNEL FOR REDUCING
XPM DETERIORATION)
Ch#3
= INVERSION OF Ch#2

OPTICAL TRANSMISSION APPARATUS, WAVELENGTH DIVISION MULTIPLEXING OPTICAL COMMUNICATION SYSTEM AND OPTICAL TRANSMISSION METHOD

CROSS-REFERENCE TO RELATED APPLICATION

This application is a continuation Application of a PCT international application No. PCT/JP2007/064366 filed on Jul. 20, 2007 in Japan, the entire contents of which are incorporated by reference.

FIELD

The embodiments discussed herein are related to an optical transmission apparatus, a wavelength division multiplexing optical communication system and an optical transmission method.

BACKGROUND ART

Wavelength division multiplexing (WDM) transmission technique employing intensity modulation optical signals (On-Off Keying) of several tens of wavelengths at 2.5 Gbps, 10 Gbps and so on has been put to practical use in terrestrial transmission systems such as access network system, metro network system, long-distance network system and the like, and submarine transmission systems. As to WDM transmission system of 40 Gbps which will soon come to practical use, development of element techniques and devices thereof accelerates, and the transmission distance and the frequency utilization efficiency equivalent to those of 10 Gbps systems are required.

As means for realizing the WDM transmission system of 40 Gbps, actively searched and developed are modulation schemes such as Optical Duobinary, CS-RZ (Carrier Suppressed-Return to Zero), DPSK (Differential Phase Shift Keying), DQPSK (Differential Quadrature Phase-Shift Keying), etc., for example. As compared with NRZ (Non Return to Zero) modulation scheme applied to conventional systems of 10 Gbps or less, these modulation schemes are promising modulation techniques as a means for realizing the WDM transmission system of 40 Gbps because part or all of frequency utilization efficiency, optical signal to noise ratio (OSNR) resistance and nonlinearity resistance are superior.

Among them, DQPSK modulation scheme is a scheme in which light having one frequency channel is quadrature-phase-modulated to transmit simultaneously two bits per one code. This scheme needs one-half the pulse repetition frequency, that is, the code transmission rate, for the data speed (for example, 40 Gbps) to be transmitted, hence the signal spectral width becomes about a half as compared with the known intensity modulation schemes. Therefore, this scheme is superior in frequency utilization efficiency, wavelength dispersion resistance, optical device transmission characteristic, etc. For this reason, application of the phase modulation scheme represented by DPSK modulation scheme and DQPSK modulation scheme is vigorously discussed in the field of optical transmission systems.

The WDM transmission system employing the intensity modulation optical signal of 2.5 Gbps or 10 Gbps, which is widely put to practical use in various systems, can be stepped up by increasing the number of wavelengths to be multiplexed. For example, C-band optical amplifier can transmit a maximum of 40 waves when the wavelength interval is 100 GHz (about 0.8 nm) because some of the C-band optical amplifiers have a signal optical bandwidth of about 32 nm. The WDM transmission system itself is capable of transmitting 40 waves (channels), but the administrator gradually increases the number of wavelengths to be used according to operational state of the network.

On the other hand, in order to suppress FWM (Four Wave Mixing) that has been a problem in WDM transmitting systems employing known NRZ modulation scheme or the like in an optical fiber applied as an optical transmission line, SMF (Single Mode Fiber) having a relatively large dispersion amount is employed. When a long-distance transmission line is configured, there occurs a problem that an effect of SPM (Self Phase Modulation) is produced.

In recent years, it is discussed that a dispersion shifted fiber (NZDSF: Non-Zero Dispersion Shifted Fiber) or the like, which has a relatively small wavelength dispersion per unit length, is applied as the transmission fiber to have a balance of effects of SPM, FWM and the like described above, thereby to obtain the optimum reception signal quality.

In the case where an optical fiber having a relatively small wavelength dispersion per unit length such as NZDSF is applied as the optical transmission line as stated above, when the number of wavelengths to be multiplexed is increased in order to step up the system as stated above, the wavelength interval is narrowed, the quantity of walkoff between the wavelengths is decreased, and the effect of cross phase modulation (XPM), which is a nonlinear effect between the wavelengths, is increased. XPM is a phenomenon that the refractive index of the optical fiber changes in proportion to a change in intensity of an optical signal having a certain wavelength and gives phase modulation to an optical signal having another wavelength.

FIGS. 16A through 16C are conceptual diagrams illustrating a phenomenon of the cross phase modulation caused by optical pulses. In FIG. 16A, $\lambda 1$ and $\lambda 2$ are optical pulses having different wavelengths. Here, it is assumed that speed of the optical pulse $\lambda 1$ is faster than that of the optical pulse $\lambda 2$ because of the dispersion characteristic of the optical fiber in which the optical pulses $\lambda 1$ and $\lambda 2$ are propagated. When the two optical pulses are propagated in the optical fiber, leading edge of the optical pulse $\lambda 1$ begins overlapping on trailing edge of the optical pulse $\lambda 2$ as illustrated in FIG. 16B because the optical pulse $\lambda 1$ travels faster than the optical pulse $\lambda 2$.

On this occasion, the leading edge of the optical pulse $\lambda 2$ is affected by phase shift due to red chirp induced by the leading edge of the optical pulse $\lambda 1$, which causes the phase of the optical pulse $\lambda 2$ to be delayed. Further, when transmission of the optical pulses $\lambda 1$ and $\lambda 2$ progresses, the optical pulse $\lambda 1$ outstrips the optical pulse $\lambda 2$ and the trailing edge of the optical pulse $\lambda 1$ overlaps on the leading edge of the optical pulse $\lambda 2$, as illustrated in FIG. 16C. On this occasion, the leading edge of the optical pulse $\lambda 2$ is affected by phase shift due to blue chirp induced by the trailing edge of the optical pulse $\lambda 1$, which causes the phase of the optical pulse $\lambda 2$ to lead.

Meanwhile, as relating techniques, there are non-patent document 1 and patent document 1 below:
Non-patent Document 1: G. Charlet et. al., "Nonlinear Interactions Between 10 Gbps NRZ Channels and 40 Gb/s Channels with RZ-DQPSK or PSBT Format, over Low-Dispersion Fiber", Mo3.2.6, ECOC2006;
Patent Document 1: Japanese Patent Application Laid-Open Publication No. H08-125605

A market demand is to provide a wavelength division multiplexing transmission system 100 which transmits a phase modulation signal of 40 Gbps in RZ-DQPSK modulation scheme or the like and intensity modulation signals of 10

Gbps (or 2.5 Gbps) in NRZ modulation scheme or the like in a mixed form, as illustrated in FIG. 17. In this case, it is supposed that an existing transmission system is stepped up to a transmission system in which a phase modulation optical signal is arranged in channel arrangement which has been usable for wavelength division multiplexing of intensity modulation optical signals.

Namely, in the optical transmission system 100 in which a plurality of OADM (Optical Add Drop Multiplexing) nodes 101 are connected in multiple stages via NZDSFs 102, optical amplifiers 103 and DCFs (Dispersion Compensating Fibers) 104 as a transmission line as illustrated in FIG. 17, it is supposed to step up a transponder configuring each transmission channel of OADM nodes 101-1 and 101-2 so that the transponder can transmit and receive the DQPSK optical signal of 40 Gbps.

In the optical transmission system 100 illustrated in FIG. 17, an add port of the OADM node 101-1 accommodates four transponders (TRPNs) 106 outputting respective NRZ intensity modulation optical signals having wavelengths of $\lambda n-2$, $\lambda n-1$, $\lambda n+1$, and $\lambda n+2$ via a multiplexer 107, along with a transponder 105-1 outputting a phase modulation optical signal in channel #n having a wavelength $\lambda n$ (n being an integer equal to three or more) in DQPSK modulation scheme, via the same.

Namely, the transponder 105-1 outputs a DQPSK optical signal of 40 Gbps differently from the transponders 106 of other channels outputting NRZ optical signals of 10 Gbps, while a transponder 105-2 receiving a wavelength $\lambda n$ in a channel #n outputted through a drop port of the OADM node 101-2 receives the DQPSK optical signal of 40 Gbps. Incidentally, reference character 108 designates a demultiplexer which separates the optical signal of $\lambda n$ from optical signals having other wavelengths dropped by an OADM node 101-2.

On this occasion, the RZ-DQPSK signal of 40 Gbps is optical-phase-shifted due to the above-mentioned XPM caused by an NRZ signal of 10 Gbps (2.5 Gbps) and waveform thereof is noticeably deteriorated, which reversely affects in long-distance transmission, as illustrated in a result of transmission simulation in FIG. 18 and the above non-patent document 1. Particularly, such deterioration of the waveform is more noticeable in NZDSF and DSF (Dispersion Shifted Fiber), which are fibers having small transmission line dispersion coefficient than a fiber (SMF) having large transmission line dispersion coefficient.

Namely, since the quantity of walkoff between the wavelengths is relatively large when an optical fiber having a sufficiently large transmission line dispersion coefficient is applied as the optical transmission line, the optical signal (unit section from the leading edge to the trailing edge) having a wavelength $\lambda 1$ illustrated in FIGS. 16A through 16C mentioned above can catch up with and outrun the optical signal having a wavelength $\lambda 2$ within one span. Accordingly, the amount of phase shift due to the generated red chirp and blue chirp illustrated in FIGS. 16A through 16C mentioned above is cancelled, hence the effect of XPM on the transmission characteristic is relatively small.

However, when an optical fiber having a relatively small transmission line dispersion coefficient is applied as the transmission line, the optical signal (unit section from the leading edge to the trailing edge) having the wavelength $\lambda 1$ illustrated in FIGS. 16A through 16C mentioned above cannot secure a sufficient amount of walkoff between the wavelengths to catch up with and outrun the optical signal having the wavelength $\lambda 2$ within one span. As a result, the amount of phase shift caused by the red chirp and blue chirp generated in FIGS. 16A through 16C is not cancelled, hence the effect of XPM on the transmission characteristic is relatively large.

Particularly, when the optical signal having a residual phase shift amount is a phase modulation optical signal, the residual phase shift amount becomes direct noise components of data symbol, which degrades the transmission performance. In FIG. 18, when the phase modulation optical signal (RZ-DQPSK signal) of 40 Gbps is of a wavelength division multiplexed optical signal in which one or five waves are multiplexed (see A and B in FIG. 18), the value of Q penalty of the reception signal remains in excellent reception signal quality even with an increase in input power to an optical fiber, which is the transmission line. However, when a mixture of four intensity modulation optical signals (NRZ signals) of 10 Gbps and the phase modulation optical signal of 40 Gbps are transmitted, the value of Q penalty of the reception signal illustrates deterioration in reception signal quality with an increase in input power to the optical fiber. Particularly, when polarized wave of the phase modulation optical signal is parallel to polarized waves of the other four intensity modulation optical signals (see D in FIG. 18), it can be said that the degradation in reception signal quality is noticeable as compared with the case where the polarized wave of the phase modulation signal is orthogonal to the polarized waves of the other four intensity modulation optical signals (see C in FIG. 18).

The non-patent document 1 mentioned above illustrates a result that when an intensity modulation optical signal of 10 Gbps is mixed with a phase modulation optical signal of 43 Gbps and transmitted in NZDSF, which is a fiber having a small wavelength dispersion value, the reception signal quality is deteriorated when the intensity modulation optical signal of 10 Gbps is positioned adjacent to the wavelength of the phase modulation optical signal of 43 Gbps, as compared with an arrangement in which the phase modulation optical signal of 43 Gbps is positioned in each wavelength channel. Incidentally, the non-patent document 1 illustrates a result that Q value illustrating the reception signal quality is more deteriorated than WDM transmission of only phase modulation optical signals of 43 Gbps even when the state of polarization is in the optimum (orthogonal) state, and the Q value is deteriorated about 3 dB in the polarization parallel state.

Generally, dispersion compensation is performed in order to suppress waveform deterioration in a repeating apparatus in an optical transmission system. When a difference in propagation delay time of an optical signal at an adjacent wavelength is compensated by this dispersion compensating function in each repeating stage, the bit arrangement on the time axis is recovered in each repeating stage, and residue of the above-mentioned red chirp is accumulated.

In other words, when an intensity modulation optical signal and phase modulation optical signals are transmitted in a mixed form as stated above, it is necessary to take more aggressive measures to suppress the effect of XPM than the case of known WDM transmission of only intensity modulation optical signals of 10 Gbps or WDM transmission of phase modulation optical signals when the transmission system is stepped up.

The non-patent document 1 does not provide a means for suppressing the effect of XPM on a phase modulation optical signal when an intensity modulation optical signal and the phase modulation optical signals are transmitted in a mixed form as stated above. Patent document 1 relates to an optical communication system which reduces deterioration of an optical signal wave due to self phase modulation effect, not providing a technique for suppressing deterioration of the transmission quality due to XPM in a network in which an intensity modulation optical signal and a phase modulation optical signal exist in a mixed form.

SUMMARY (1) According to an aspect of the embodiments, an apparatus includes an optical transmission apparatus transmitting a wavelength division multiplexed optical signal of an intensity modulation optical signal and a phase modulation optical signal through an optical transmission line, the optical transmission apparatus including an intensity inversion signal light output unit that outputs light having an intensity pattern obtained by inverting intensity changes of the intensity modulation optical signal near a wavelength of the intensity modulation optical signal in arrangement on wavelength axis of optical wavelengths that can be multiplexed as the wavelength division multiplexed optical signal, and a wavelength division multiplexed optical signal output unit that wavelength-division-multiplexes the intensity modulation optical signal, the phase modulation optical signal and light from the intensity inversion signal light output unit and outputs a wavelength-division-multiplexed optical signal that the intensity modulation optical signal, the phase modulation optical signal and the light from the intensity inversion signal light output unit are wavelength-division-multiplexed.

(2) According to an aspect of the embodiments, an apparatus includes an optical transmission apparatus transmitting a wavelength division multiplexed optical signal of an intensity modulation optical signal and a phase modulation optical signal through an optical transmission line, the optical transmission apparatus including a non-zero dispersion-shifted single mode optical fiber or a dispersion-shifted optical fiber comprises an intensity inversion signal light output unit that outputs light having an optical wavelength for an intensity inversion signal light at which the intensity modulation optical signal and the phase modulation optical signal are not positioned and near the intensity modulation optical signal on wavelength axis of optical wavelengths that can be multiplexed as the wavelength division multiplexed optical signal, and having an intensity pattern obtained by inverting intensity changes of the intensity modulation optical signal, and a wavelength division multiplexed optical signal output unit that wavelength-division-multiplexes the intensity modulation optical signal, the phase modulation optical signal and light from the intensity inversion signal light output section and outputs a wavelength-division multiplexed signal that the intensity modulation optical signal, the phase modulation optical signal and the light from the intensity inversion signal light output unit are wavelength-division-multiplexed.

(3) According to an aspect of the embodiments, a system includes a wavelength division multiplexing optical communication system having an optical transmitter being able to transmit a wavelength division multiplexed optical signal of an intensity modulation optical signal and a phase modulation optical signal, an optical transmission line being able to transmit the wavelength division multiplexed optical signal transmitted from the optical transmitter, and an optical receiver being able to receive the wavelength division multiplexed optical signal from the optical transmission line, the wavelength division multiplexing optical communication system including the optical transmitter comprising an intensity inversion signal light output unit that outputs light having an intensity pattern obtained by inverting intensity changes of the intensity modulation optical signal near a wavelength of the intensity modulation optical signal in arrangement on wavelength axis of optical wavelengths that can be multiplexed as the wavelength division multiplexed optical signal as intensity inversion signal light, and a wavelength division multiplexed optical signal output unit that wavelength-division-multiplexes and outputs the intensity modulation optical signal, the phase modulation optical signal and the light from the intensity inversion signal light output section a wavelength-division-multiplexed optical signal that the intensity modulation optical signal, the phase modulation optical signal and the light from the intensity inversion signal light output unit are wavelength-division-multiplexed, and the optical receiver comprising a reception processing unit that performs reception processing on an optical signal set as a reception wavelength among optical signals wavelength-division-multiplexed in the wavelength division multiplexed optical signal.

(4) According to an aspect of the embodiments, a method includes an optical transmission method for transmitting a wavelength division multiplexed optical signal of an intensity modulation optical signal and a phase modulation optical signal through an optical transmission line, the optical transmission method including outputting light having an intensity pattern obtained by inverting intensity changes of the intensity modulation optical signal near a wavelength of the intensity modulation optical signal in arrangement on wavelength axis of optical wavelengths that can be multiplexed as the wavelength division multiplexed optical signal as an intensity inversion signal light, and wavelength-division-multiplexing the intensity modulation optical signal, the phase modulation optical signal and the intensity inversion signal light and outputting a wavelength-division-multiplexed optical signal that the intensity modulation optical signal, the phase modulation optical signal and the light from the intensity inversion signal light output unit are wavelength-division-multiplexed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described with reference to the drawings. Note that the embodiments are not limited to the embodiments to be described below, but may be modified in various ways without departing from sprits and scope of the embodiments, as a matter of course.

[A] Description of Embodiment

Figure 1:
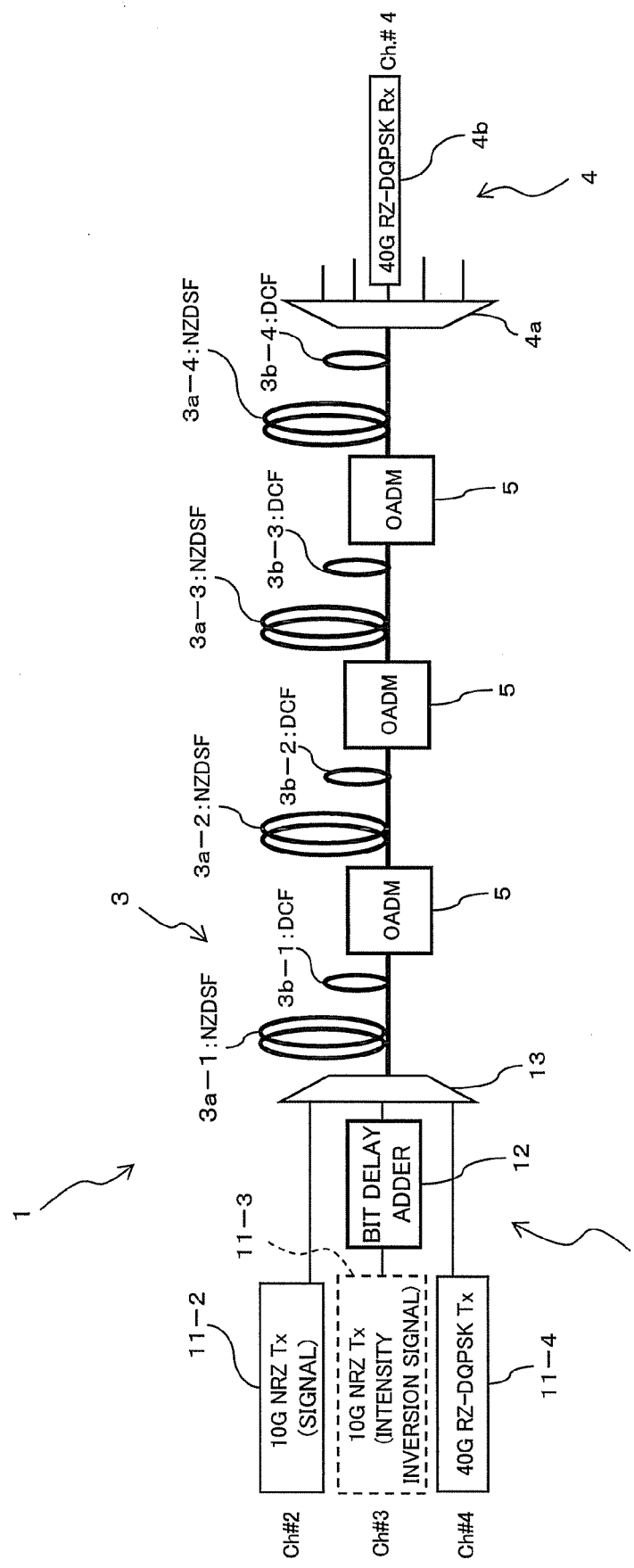
FIG. 1 is a drawing illustrating a wavelength division multiplexing optical communication system according to an embodiment.

FIG. 1 is a diagram illustrating a wavelength division multiplexing optical communication system according to an embodiment. The wavelength division multiplexing optical communication system 1 illustrated in FIG. 1 has an optical transmitter (optical transmission apparatus) 2 which can transmit a wavelength division multiplexed optical signal of an intensity modulation optical signal and a phase modulation optical signal, an optical transmission line 3 which can transmit the wavelength division multiplexed optical signal transmitted from the optical transmitter 2, and an optical receiver 4 which can receive the wavelength division multiplexed optical signal from the optical transmission line 3.

The optical transmission line 3 in FIG. 1 is configured by connecting non-zero dispersion-shifted fibers (NZDSF) 3a-1 to 3a-4 and dispersion compensating fibers (DCF) 3b-1 to 3b-4 via a plurality (three in the drawing) of OADM nodes 5.

The optical transmitter 2 transmits a wavelength division multiplexed optical signal of an intensity modulation optical signal and a phase modulation optical signal through the optical transmission line 3. For this purpose, the optical transmitter 2 has a plurality of channel light output units 11 correspondingly to arrangement (channels) on the wavelength axis of optical wavelengths that can be wavelength-division-multiplexed into a wavelength division multiplexed optical signal, and a wavelength division multiplexing unit 13 which wavelength-division-multiplexes channel light outputted from the channel light output units 11. Incidentally, in the optical transmitter 2 illustrated in FIG. 1, there are provided channel light output units 11-2 to 11-4 in number equal to three channels (Ch#2 to Ch#4 where signal optical wavelengths λ2 to λ4 are arranged at long wavelengths in order).

The optical receiver 4 has a demultiplexing unit 4a which demultiplexes the wavelength division multiplexed light propagated from the optical transmitter 2 through the optical transmission line 3, and a reception processing unit 4b which performs reception processing on an optical signal [optical signal in Ch#4 (wavelength λ4) in FIG. 1] set as a reception wavelength among optical signals in respective channels demultiplexed by the demultiplexing unit 4a.

Each of the channel light output units 11 configuring the optical transmitter 2 modulates an inputted electric signal into an optical signal in a corresponding modulation scheme, which has a known modulator configuration. The channel light output unit [10G NRZ Tx(signal)] 11-2 generates an optical signal (wavelength λ2) intensity-modulated (NRZ-modulated in this case) at a bit rate of 10 Gbps, and outputs the optical signal. The channel light output unit [40G RZ-DQPSK Tx] 11-4 generates an optical signal (wavelength λ4) phase-modulated (RZ-DQPSK-modulated in this case) at a bit rate of 40 Gbps, and outputs the optical signal. Accordingly, the above-mentioned channel light output unit 11-2 configures an intensity modulation optical signal output unit which outputs an intensity modulation optical signal, whereas the channel light output unit 11-4 configures a phase modulation optical signal output unit which outputs a phase modulation optical signal through an optical wavelength differing from that of the channel light output unit 11-2.

Figure 2A:
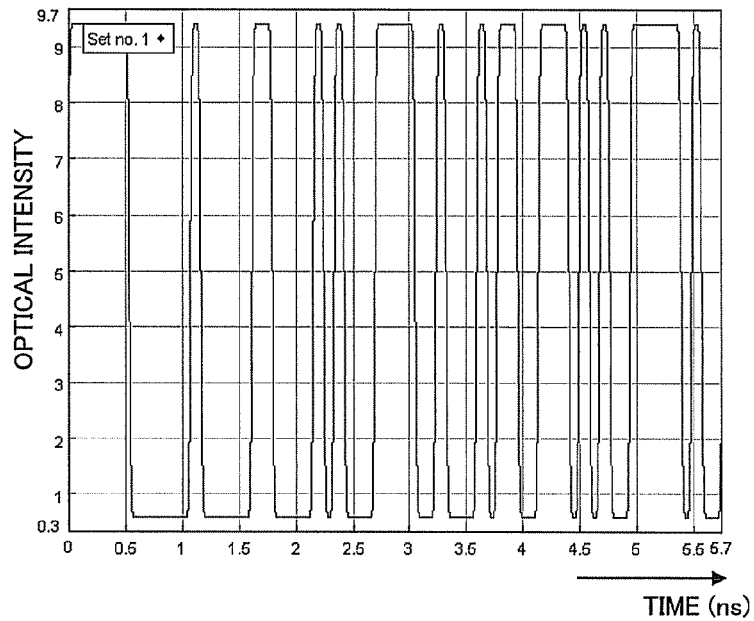
FIGS. 2A and 2B are diagrams illustrating a mode of code inversion of an intensity modulation optical signal to an intensity inversion signal light.
Figure 2B:
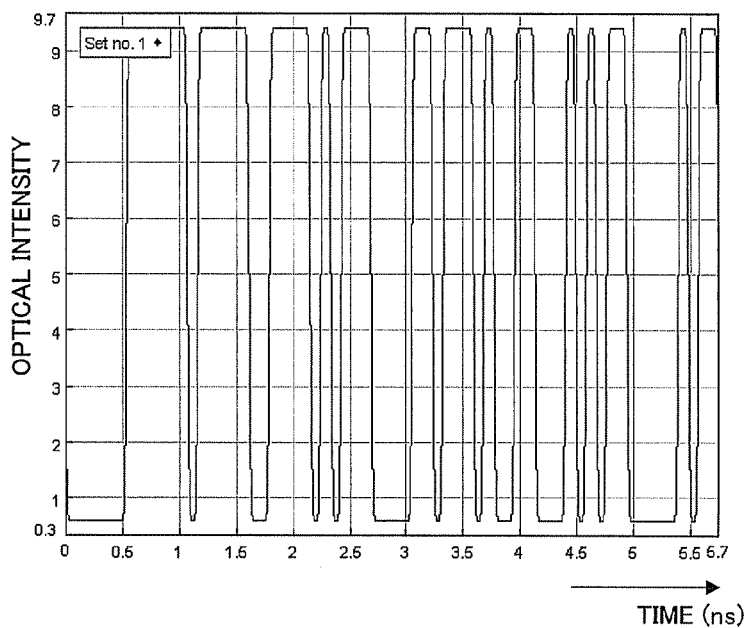

The channel light output unit [10G NRZ Tx (intensity inversion signal)] 11-3 NRZ-modulates an electric signal having a code pattern obtained by inverting a code pattern of a signal to be modulated into an optical signal by the channel light output unit 11-2, and outputs an intensity inversion signal light (wavelength λ3) having an intensity modulation pattern which is the inverse of an intensity modulation pattern of an optical signal to be outputted from the channel light output unit 11-2. For example, when the channel light output unit 11-2 outputs light having a pattern whose light intensity is changed on the time axis as illustrated in FIG. 2A, the channel light output unit 11-3 can output light having an intensity change pattern which is the inverse of the pattern in FIG. 2A, as illustrated in FIG. 2B.

Accordingly, the above-mentioned channel light output unit 11-3 configures an intensity inversion signal light generating unit which generates intensity inversion signal light having an optical wavelength λ3 for intensity inversion signal light, at which wavelength the intensity modulation optical signal and the phase modulation optical signal are not positioned, in the vicinity of the intensity modulation optical signal from the channel light output unit 11-2 in arrangement on the wavelength axis of optical wavelengths that can be multiplexed as a wavelength division multiplexed optical signal, and having an intensity pattern obtained by inverting intensity changes of the intensity modulation optical signal from the channel light output unit 11-2.

The wavelength division multiplexing unit 13 wavelength-division-multiplexes the intensity inversion signal light from the channel light output unit 11-3 and the optical signals from the channel light output units 11-2 and 11-4 so as to reduce the amount of XPM having an effect on the phase modulation optical signal outputted from the channel light output unit 11-4. In other words, the wavelength division multiplexing unit 13 configures a wavelength division multiplexed optical signal output unit which wavelength-division-multiplexes an intensity modulation optical signal from the channel light output unit 11-2, a phase modulation optical signal from the channel light output unit 11-4 and light from the channel light output unit 11-3 and outputs a obtained wavelength division multiplexed optical signal.

The optical transmitter 2 according to this embodiment has a bit delay adder 12 which adds bit delay to the intensity inversion signal light from the channel light output unit 11-3. The channel light output unit 11-3 and the bit delay adder 12 together configure an intensity inversion signal light output unit which outputs light, which has an optical wavelength $\lambda 3$ for intensity inversion signal light and has an intensity pattern which is the inverse of intensity changes of the intensity modulation optical signal from the channel light output unit 11-2, as an intensity inversion signal light. Incidentally, setting of a delay amount by the bit delay adder 12 will be described later.

Figure 3:
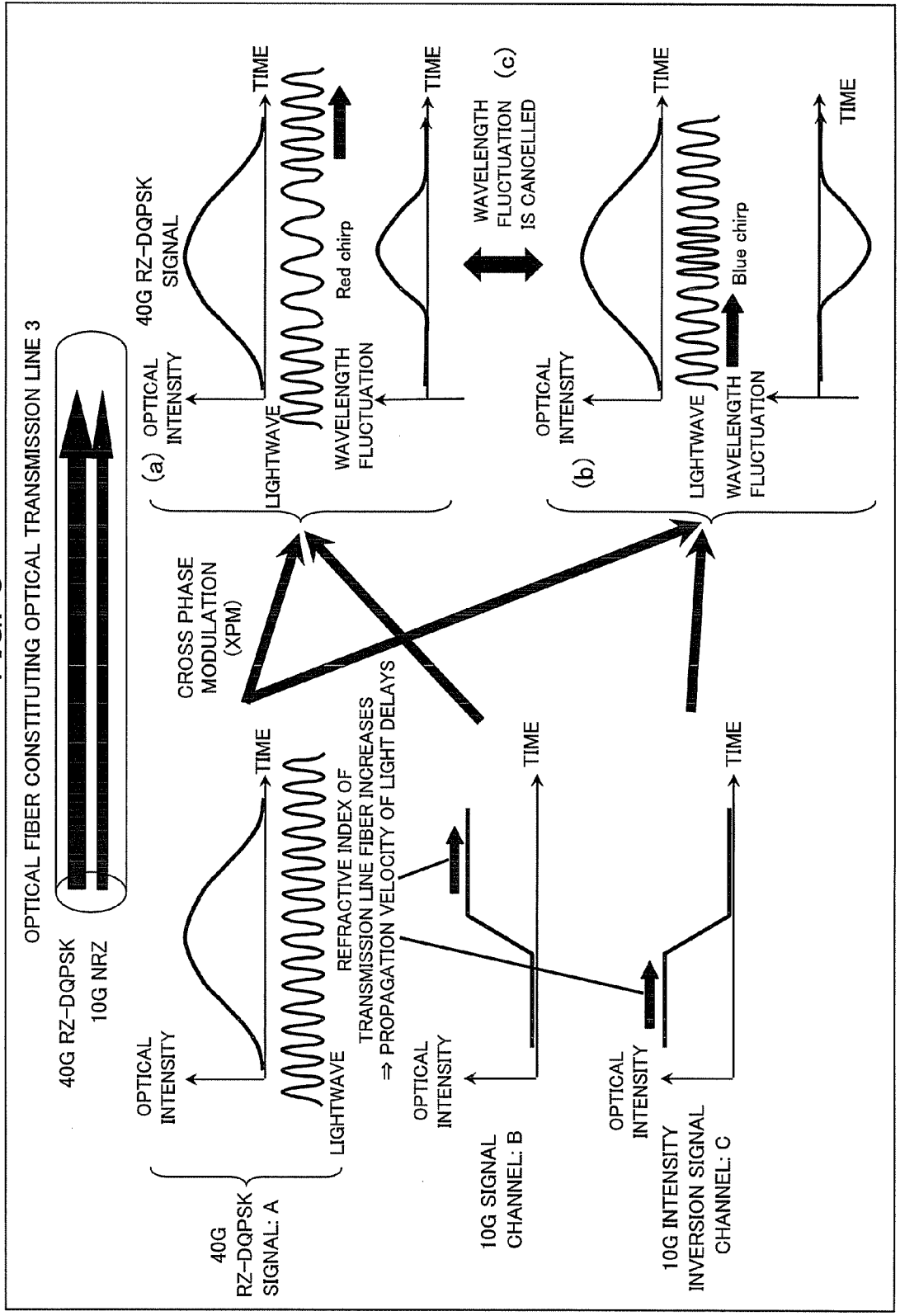
FIG. 3 is a diagram illustrating a working effect according to the embodiment.

FIG. 3 is a diagram illustrating that the intensity inversion signal light outputted from the channel light output unit 11-3 can reduce the amount of XPM having an effect on the phase modulation optical signal outputted from the channel light output unit 11-4. Physical characteristics of the optical fibers (NZDSF 3a-1 to 3a-4, etc.) configuring the optical transmission line 3 causes an increase in refractive index of the optical fiber when light intensity of the propagated light is large, which retards propagation velocity of the light wave.

Namely, the phase modulation optical signal A outputted from the channel light output unit 11-4 through the wavelength division multiplexing unit 13 is subjected to wavelength shift (Red chirp) on the longer wavelength's side as illustrated at (a) in FIG. 3 because the refractive index of the optical fiber is increased by rise of the intensity modulation optical signal B of 10 Gbps outputted from the channel light output unit 11-2, while being subjected to wavelength shift (Blue chirp) on the shorter wavelength's side as illustrated at (b) in FIG. 3 because the refractive index of the optical fiber is decreased by fall of the intensity inversion signal light C outputted from the channel light output unit 11-3.

Whereby, the wavelength shift on the longer wavelength's side caused by the intensity modulation optical signal B from the channel light output unit 11-2 is cancelled by the intensity inversion signal light C from the channel light output unit 11-3 (see (c) in FIG. 3) so that an amount of the wavelength shift of the phase modulation optical signal A propagated in the optical transmission line 3 due to XPM can be decreased. Meanwhile, the wavelength shift due to XPM can be considered as phase shift for the phase modulation optical signal. In other words, red chirp corresponds to phase shift of phase delay, while blue chirp corresponds to phase shift of phase lead, which directly affects on modulation components of the phase modulation optical signal.

As above, when the intensity modulation optical signal from the channel light output unit 11-2 is propagated in the optical transmission line 3, the phase modulation optical signal from the channel light output unit 11-4 is subjected to wavelength shift on the longer wavelength's side, that is, XPM of phase delay, while XPM of phase lead which cancels the XPM of phase delay is given to the above phase modulation optical signal by simultaneously propagating the intensity inversion signal light from the channel light output unit 11-3 in the optical transmission line 3 together with the intensity modulation optical signal. This makes it possible to suppress deterioration of transmission quality of the phase modulation optical signal due to XPM in the wavelength division multiplexing optical communication system 1 in which the intensity modulation optical signal and the phase modulation optical signal exist in a mixed form.

Figure 4:
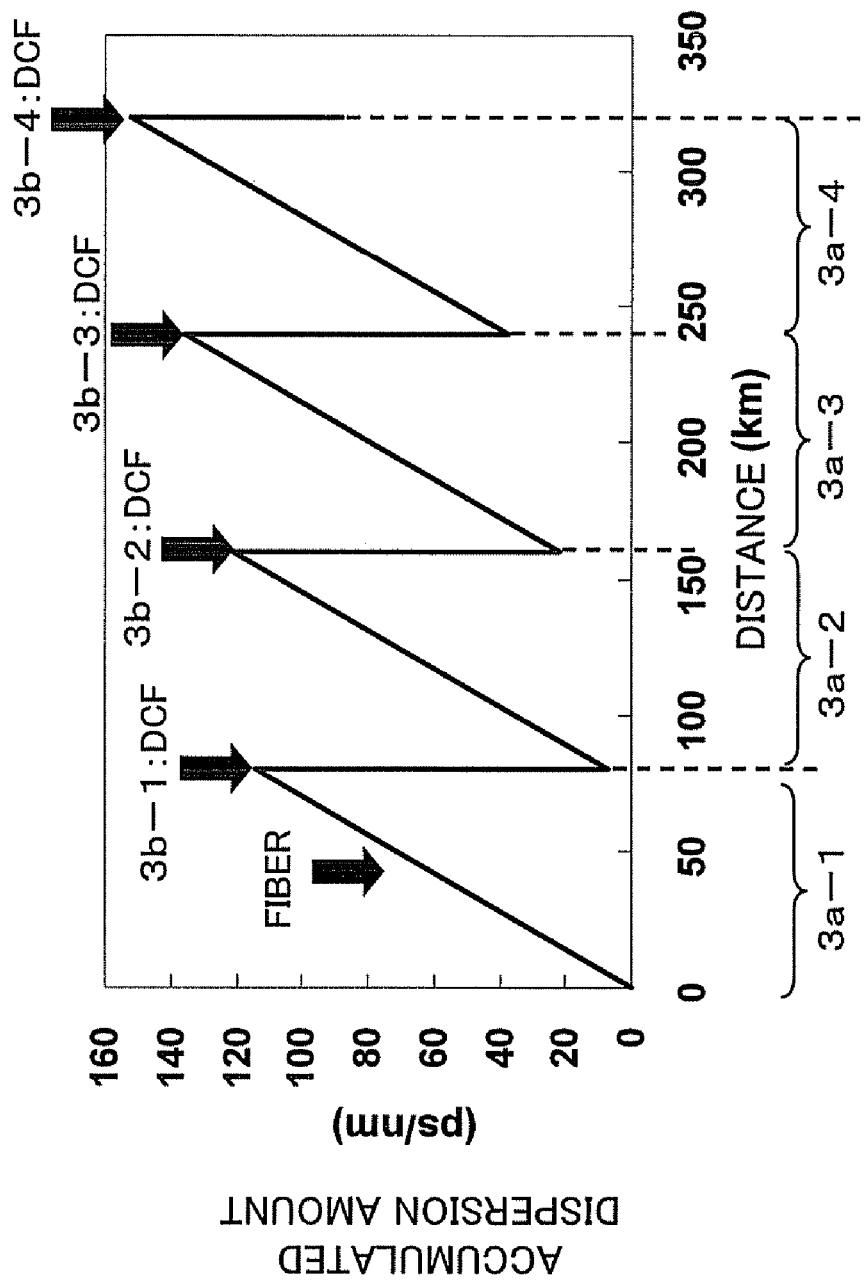
FIG. 4 is a diagram illustrating an example of dispersion map in an optical transmission line constituting the wavelength division multiplexing optical communication system according to the embodiment.
Figure 5:
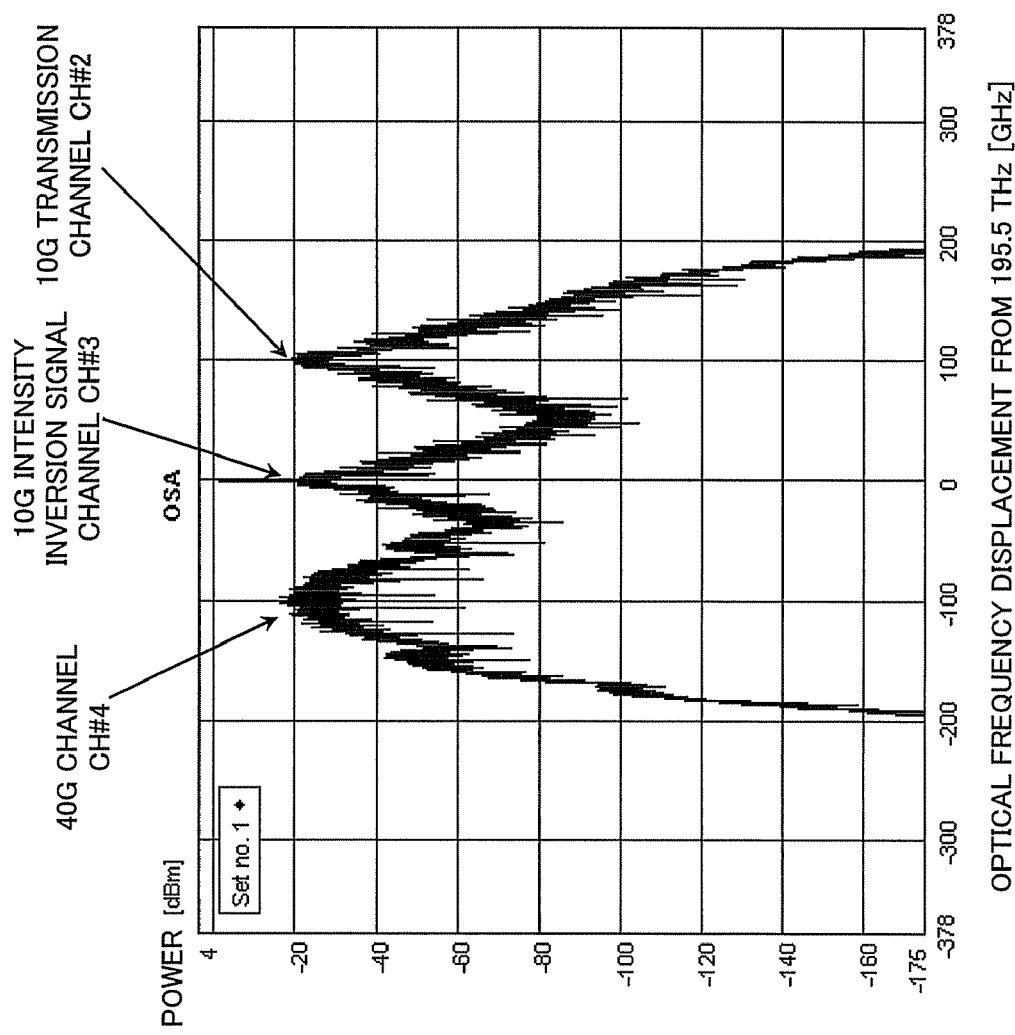
FIG. 5 is a diagram illustrating a result of transmission simulation by applying the intensity inversion signal light according to the embodiment.
Figure 6:
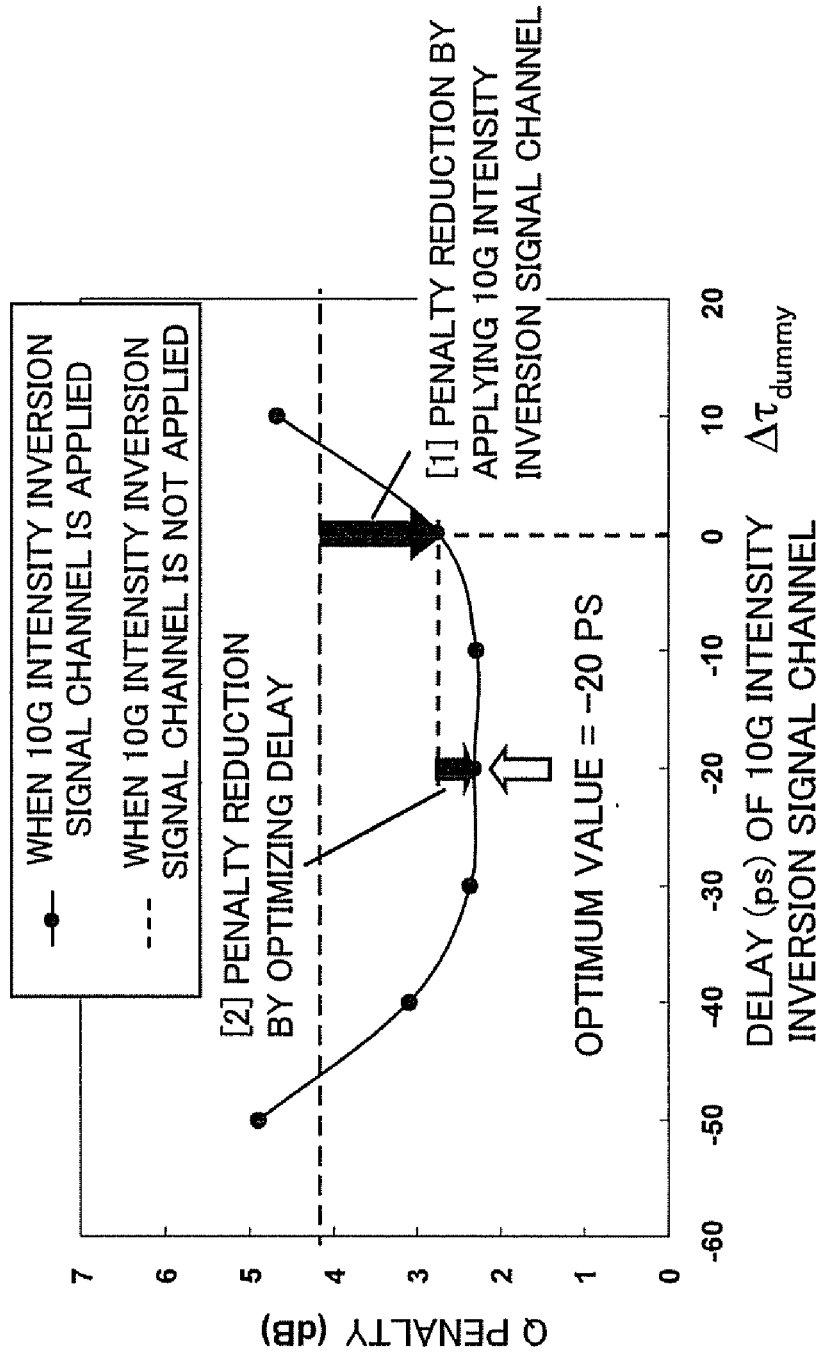
FIG. 6 is a diagram illustrating a result of transmission simulation by applying the intensity inversion signal light according to the embodiment.
Figure 7:
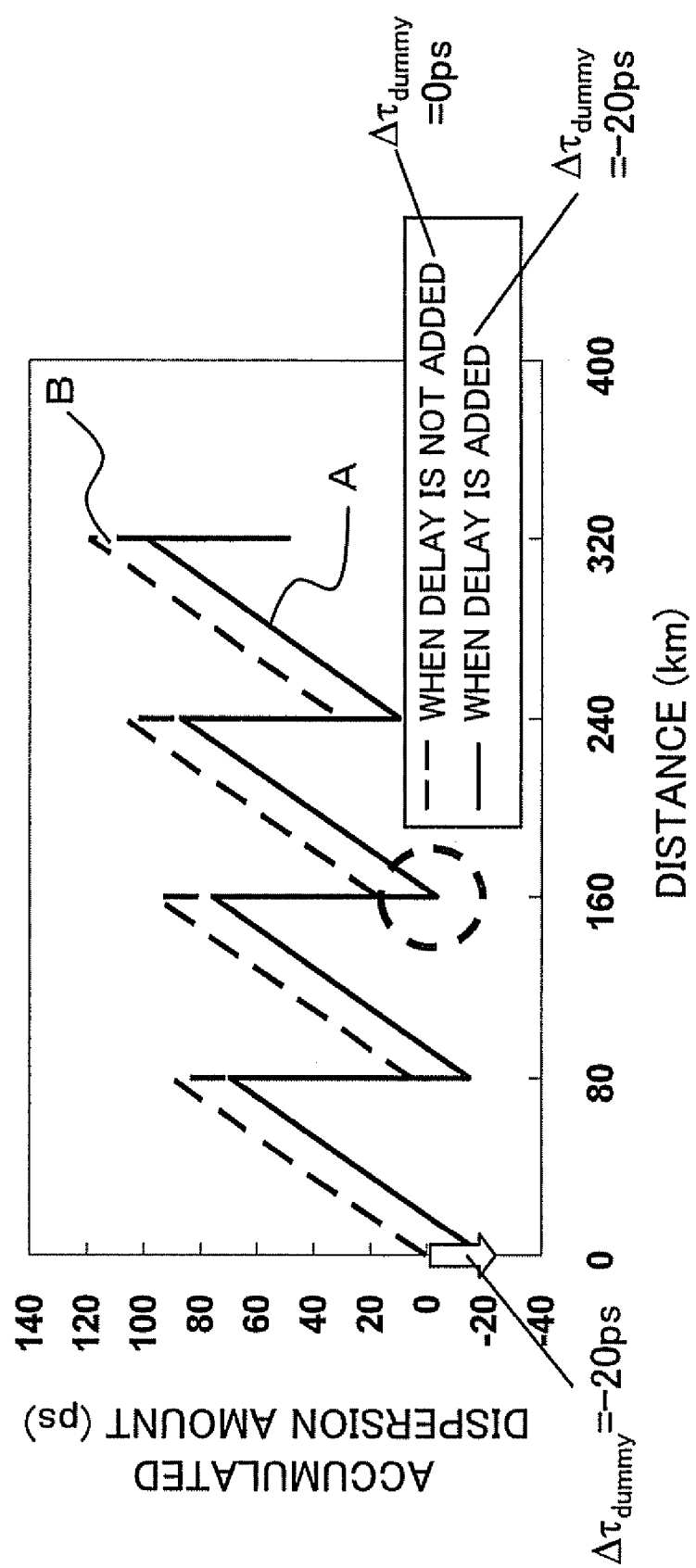
FIG. 7 is a diagram illustrating a result of transmission simulation by applying the intensity inversion signal light according to the embodiment.

FIG. 4 is a diagram illustrating an example of dispersion map in the optical transmission line 3 of the wavelength division multiplexing optical communication system 1 according to the embodiment. In the dispersion map illustrated in FIG. 4, dispersion produced in each of the NZDSFs 3a-1 to 3a-4 is compensated by giving a residual dispersion value in each of the corresponding DCFs 3b-1 to 3b-4. FIGS. 5 to 7 illustrate a result of transmission simulation obtained by applying the intensity inversion signal light according to this embodiment in the wavelength division multiplexing optical communication system 1 employing the optical transmission line 3 having the dispersion characteristics illustrated in FIG. 4.

Owing to the channel light output units 11-2 to 11-4 illustrated in FIG. 1, an intensity modulation optical signal channel of 10 Gbps is positioned on the shorter wavelength's side (Ch#2) of the phase modulation optical signal (Ch#4) of 40 Gbps, and a channel (intensity inversion signal channel) outputting the intensity inversion signal light of 10 Gbps is positioned at a channel (the adjacent channel Ch#3 in this embodiment) having a neighboring wavelength of the intensity modulation optical signal of 10 Gbps. FIG. 5 is a diagram illustrating a spectrum of wavelength division multiplexed signal light (transmission light) obtained by wavelength-division-multiplexing the light from the above-mentioned channel light output units 11-2 to 11-4.

The bit delay adder (timing adjusting unit) 12 adds the above-mentioned delay to the intensity inversion signal light from the channel light output unit 11-3. This delay addition enables output timing adjustment on the basis of a difference in propagation time between the intensity inversion signal light and the intensity modulation optical signal in channel Ch#2 caused by light propagation over the optical transmission line 3.

FIG. 6 is a diagram illustrating a result of simulation of reception signal quality (Q penalty) of the phase modulation signal of 40 Gbps given a delay amount by the bit delay adder 12 when the wavelength division multiplexed signal light transmitted from the optical transmitter 2 is received by the optical receiver 4 as stated above. As illustrated in FIG. 6, improvement of the signal quality in a certain degree is found within a range from −40 to 0 ps of the delay addition amount $\Delta\tau$dummy (see [1] in FIG. 6). Particularly, when the delay addition amount $\Delta\tau$dummy is −20 ps, the optimum signal quality is obtained (see [2] in FIG. 6).

A reason of this is that a difference in delay is produced due to wavelength dispersion in the optical transmission line 3 because a channel of the intensity modulation optical signal of 10 Gbps differs in wavelength from the intensity inversion signal channel. A in FIG. 7 designates a dispersion map when the above-mentioned delay $\Delta\tau$dummy=−20 ps is added to the intensity inversion signal channel Ch#3, whereas B designates a dispersion map of Ch#3 when delay is not added ($\Delta\tau$dummy=0 ps). As illustrated at A in FIG. 7, delay $\Delta\tau$dummy corresponding to a compensation amount (−20 ps) for 20 ps, which is one-half the difference (40 ps) in light propagation time between the wavelength $\lambda 2$ of the channel Ch#2 and the wavelength $\lambda 3$ of the intensity inversion signal channel Ch#3 in the optical transmission line 3, is added by the bit delay adder 12. Whereby, the red chirp and blue chirp produced in the phase modulation optical signal by the intensity modulation optical signal in the channel Ch#2 can be efficiently cancelled each other.

Figure 8:
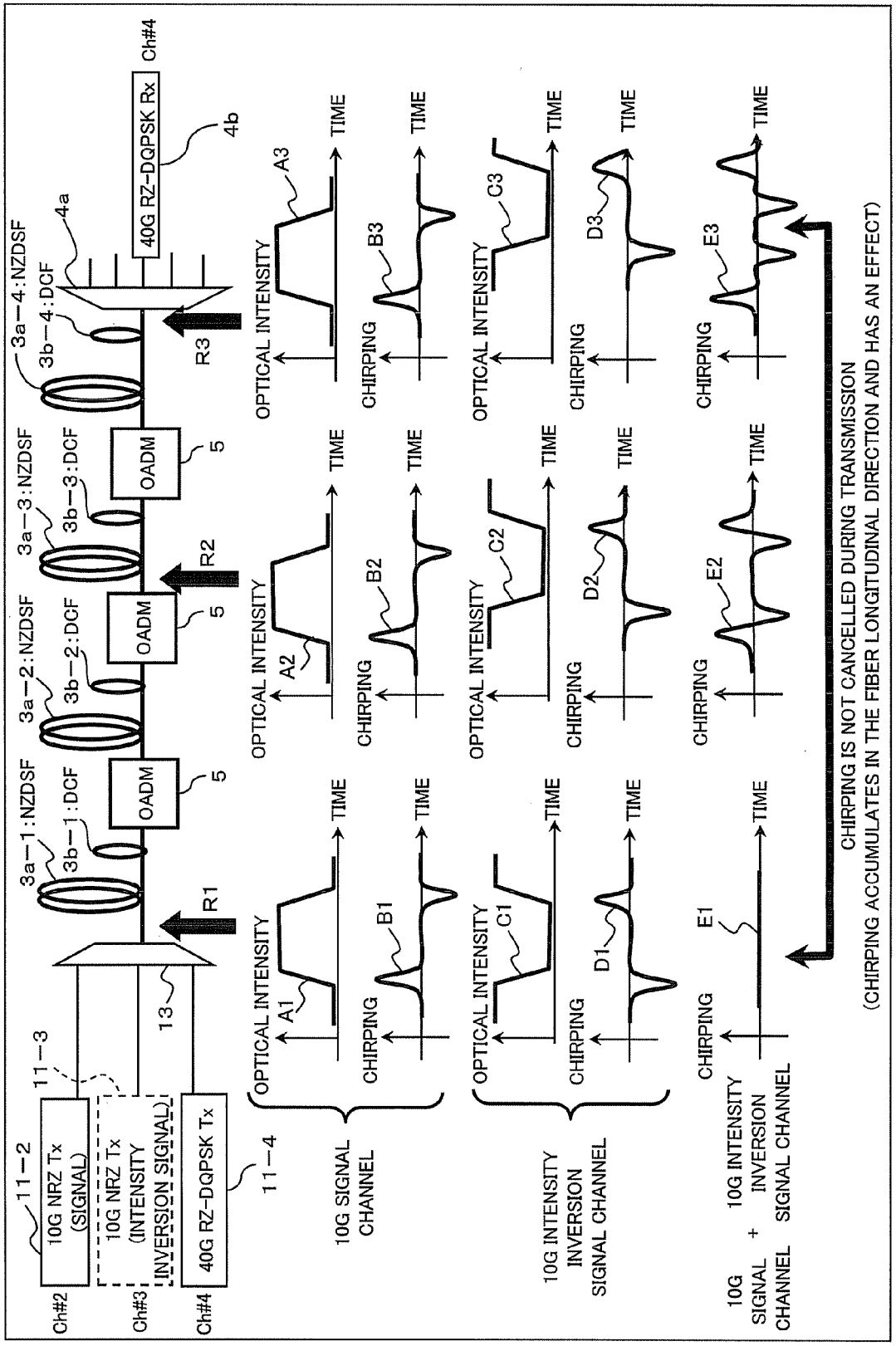
FIG. 8 is a diagram illustrating a mode in which chirping is produced over the optical transmission line when bit delay is not added without a bit delay adder according to the embodiment.
Figure 9:
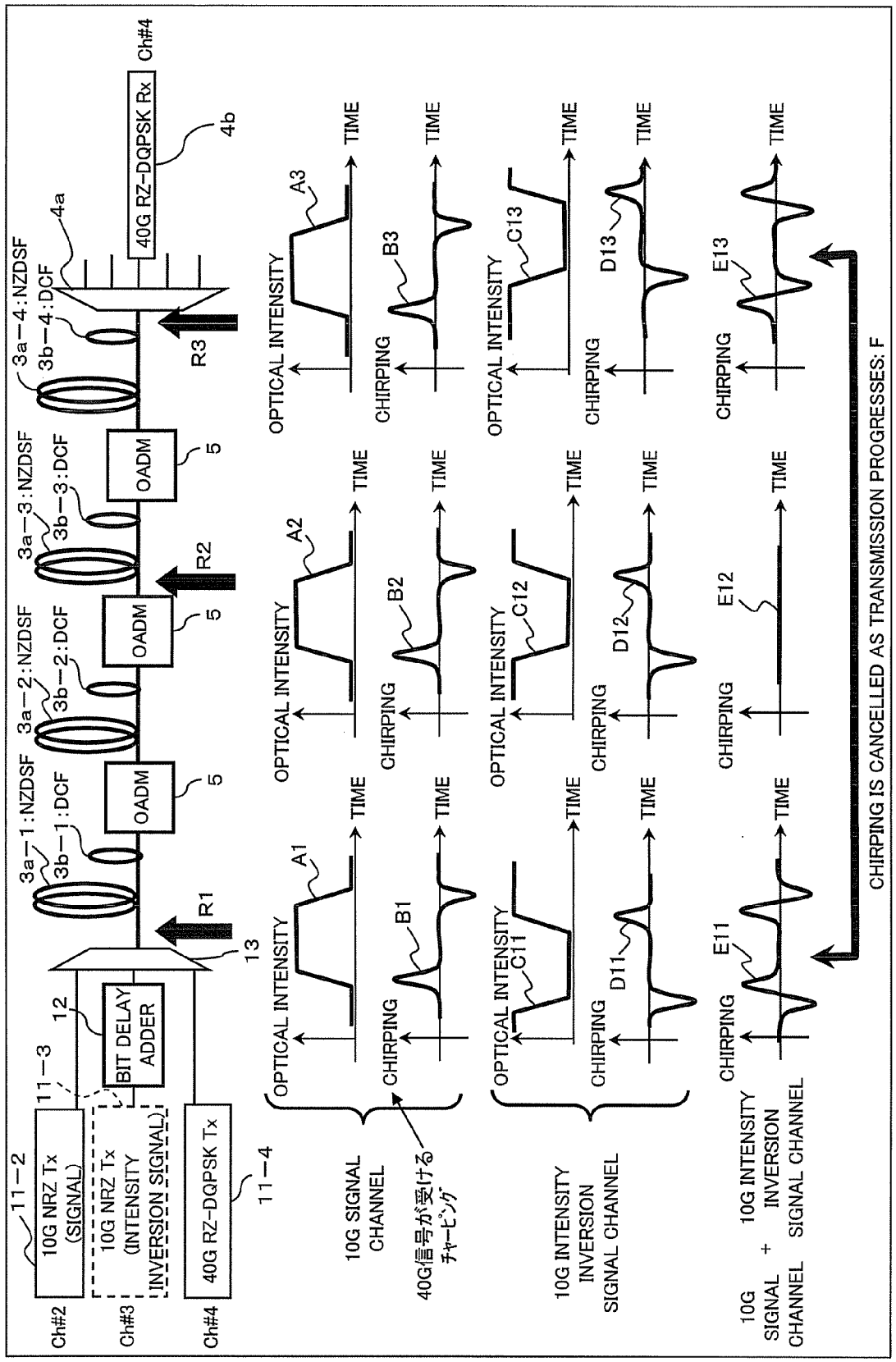
FIG. 9 is a diagram illustrating a mode in which chirping is produced over the optical transmission line when an optimum delay amount is added by the bit delay adder according to the embodiment.

FIGS. 8 and 9 are diagrams illustrating modes of generation of chirping on the transmission line 3, by comparing a case where bit delay is not added without the above-mentioned bit delay adder 12 ($\Delta\tau$dummy=0 ps, see FIG. 8) with a case where the above optimum delay amount ($\Delta\tau$dummy=−20 ps) is added (see FIG. 9). In this embodiment, since the phase modulation optical signal (Ch#4) has a longer wavelength than the intensity modulation optical signal (Ch#2) and the intensity inversion signal light (Ch#3), the propagation velocity of the phase modulation optical signal (Ch#4) in the optical transmission line 3 is faster than the intensity modulation optical signal (Ch#2) and the intensity inversion signal light (Ch#3) due to dispersion.

Wavelength shift (chirping) due to XPM to which the phase modulation optical signal is subjected generates when a pulse of the intensity modulation optical signal (or the intensity inversion signal light) rises and falls. A1 to A3 in FIGS. 8 and 9 illustrate the same optical pulse A, which is outputted from the channel Ch#2 of the intensity modulation optical signal and is successively propagated from a propagation area R1 on the transmission end's side of the optical transmitter 2 to a propagation area R3 on the reception end's side of the optical receiver 4 via an intermediate propagation area R2 of the optical transmission line 3.

The phase modulation optical signal suffers chirping as illustrated in at B1 to B3 caused by rise and fall of the optical pulses A1 to A3. Namely, the phase modulation optical signal suffers red chirp (chirping in the positive direction) when each of the optical pulses A1 to A3 rises, while suffers blue chirp (chirping in the negative direction) when the optical pulses A1 to A3 fall, as illustrated at B1 to B3. When the intensity inversion signal light is not propagated, an amount of chirp that the phase modulation optical signal suffers during propagation from the propagation area R1 on the transmission end's side to the propagation area R3 on the reception end's side in the optical transmission line 3 is a value that is an accumulation of chirp amounts illustrated at B1 to B3 generated in the course of the propagation in the optical transmission line 3.

On the other hand, pulse pattern of the intensity inversion signal light outputted from the intensity inversion signal channel Ch#3 has a pattern of intensity changes that is the inverse of that of the intensity modulation optical signal in Ch#2, as illustrated at C1. However, since the intensity inversion signal light has a different wavelength, optical pulse pattern of the intensity inversion signal light pulse C1, which is inverse but is on the same line as the intensity modulation optical signal in Ch#2 in the transmission area R1 on the transmission end's side, travels faster than the optical pulses A2 and A3 of the intensity modulation optical signal as illustrated at C2 and C3 as the optical pulse pattern of the intensity inversion signal light advances to the intermediate propagation area R2 in the optical transmission line 3 and to the propagation area R3 on the reception end's side.

The phase modulation optical signal suffers chirping as illustrated at D1 to D3 due to rise and fall of the intensity inversion signal light pulses C1 to C3. The chirping caused by the intensity inversion signal light pulses C1 to C3 that the phase modulation optical signal suffers is basically the inverse of chirping caused by the optical pulses of the aforementioned intensity modulation optical signal. For example, as amount of chirp generated in the transmission area R1 on the transmission end's side in which the patterns are in an inverse relationship but on the same line, blue chirp is produced when the intensity inversion signal light pulse C1 falls, while red chirp is produced when the same rises, as illustrated at D1.

Accordingly, the chirping B1 caused by rise and fall of the optical pulse A1 of the intensity modulation optical signal is cancelled by the chirping D1 caused by fall and rise of the intensity inversion signal light in the propagation area R1 on the transmission end's side so that the total chirp amount that the phase modulation optical signal suffers can be substantially made zero as illustrated at E1. In the intermediate propagation area R2 of the optical transmission line 3 and the propagation area R3 on the reception end's side, timings of fall and rise of the intensity inversion optical pulses C2 and C3 are shifted from timings of rise and fall of optical pulses A2 and A3 of the intensity modulation optical signal. As a result, the total chirp amount that the phase modulation optical signal suffers can not be substantially made zero as illustrated at E2 and E3.

In the case illustrated in FIG. 8, propagation of the intensity inversion signal light can cancel many of components of the chirp amounts C1 to C3 caused by the phase modulation optical signal. This makes it possible to largely reduce the chirp amount that the phase modulation optical signal receives during propagation of the phase modulation optical signal from the propagation area R1 on the transmission end's side to the propagation area R3 on the reception end's side in the optical transmission line 3, as compared with a value that is accumulation of chirp amounts produced at 31 to 33 in the course of the propagation in the optical transmission line 3.

As illustrated in FIG. 9, when the optimum delay amount ($\Delta\tau$dummy=$-20$ ps) is added to the intensity inversion signal light by the bit delay adder 12, the mode of generation of chirping caused by the intensity modulation optical signal is similar to the case illustrated in FIG. 8 (see A1 to A3 and B1 to B3 in FIG. 9). However, chirping caused by intensity inversion signal optical pulses C11 to C13, to which delay is added by the bit delay adder 12, differs in generation timing of blue chirp and red chirp from D1 to D3 in FIG. 8, as illustrated at D11 to D13.

Namely, the intensity inversion signal optical pulse C11 having the inverted pattern lags by the delay time behind the optical pulse A1 of the intensity modulation optical signal in the transmission area R1 on the transmission end's side in the optical transmission line 3. In the intermediate propagation area R2, the intensity inversion signal optical pulse C12 having the inverted pattern is on the same line (catches up with) as the optical pulse A2, and the intensity inversion signal optical pulse C13 having the inverted pattern is ahead of (passes) the optical pulse A3 in the propagation area R3 on the reception end's side.

In the intermediate propagation area R2, the chirping B2 caused by rise and fall of the optical pulse A2 of the intensity modulation optical signal is cancelled by chirping caused by fall and rise of the intensity inversion signal optical pulse C12 so that the total chirp amount that the phase modulation optical signal suffers can be substantially made zero as illustrated at E12. In the propagation areas R1 and R3 on the transmission and reception end's sides in the optical transmission line 3, timings of fall and rise of the intensity inversion signal optical pulses C11 and C13 are shifted from timings of rise and fall of the optical pulses A1 and A3 of the intensity modulation optical signal, hence a sum of chirping that the phase modulation optical signal suffers in the propagation areas R1 and R3 cannot be substantially made zero. However, since the chirping E11 and the chirping E13 have chirp generation patterns reversal to each other, the chirping generated in the propagation area R1 on the transmission end's side and the chirping generated in the propagation area R3 on the reception end's side are cancelled each other by propagating the same pulse A from the propagation area R1 on the transmission end's side to the propagation area R3 on the reception end's side (see F in FIG. 9), whereby XPM components appearing in the phase modulation optical signal received by the optical receiver 4 can be substantially made zero.

According to the embodiment, light having a wavelength for intensity inversion signal light positioned in the vicinity of an intensity modulation optical signal, at which the intensity modulation optical signal and a phase modulation optical signal are not positioned, in arrangement on the wavelength axis of light wavelengths that can be multiplexed as a wavelength division multiplexed optical signal and having an intensity pattern obtained by inverting intensity changes of the intensity modulation optical signal is outputted as an intensity inversion signal light, and is wavelength-division-multiplexed together with the intensity modulation optical signal and the phase modulation optical signal and outputted as a wavelength division multiplexed optical signal, whereby deterioration of transmission quality due to XPM can be suppressed in a wavelength division multiplexing optical communication system in which an intensity modulation optical signal and a phase modulation optical signal exist in a mixed form.

Even when configuration of the optical transmission line 3 or configuration of existing repeating nodes 5, for example, and existing transmission line dispersion map are given, it is possible to suppress deterioration of transmission quality of the phase modulation optical signal due to XPM only by adding and transmitting light in an intensity inversion signal channel. Accordingly, this embodiment can diminish the deterioration due to XPM, simply and at low cost.

Note that the embodiment is not limited to the above channel arrangement of the phase modulation optical signal, the intensity modulation optical signal and the intensity inversion signal light explained in the embodiment.

Figure 10:
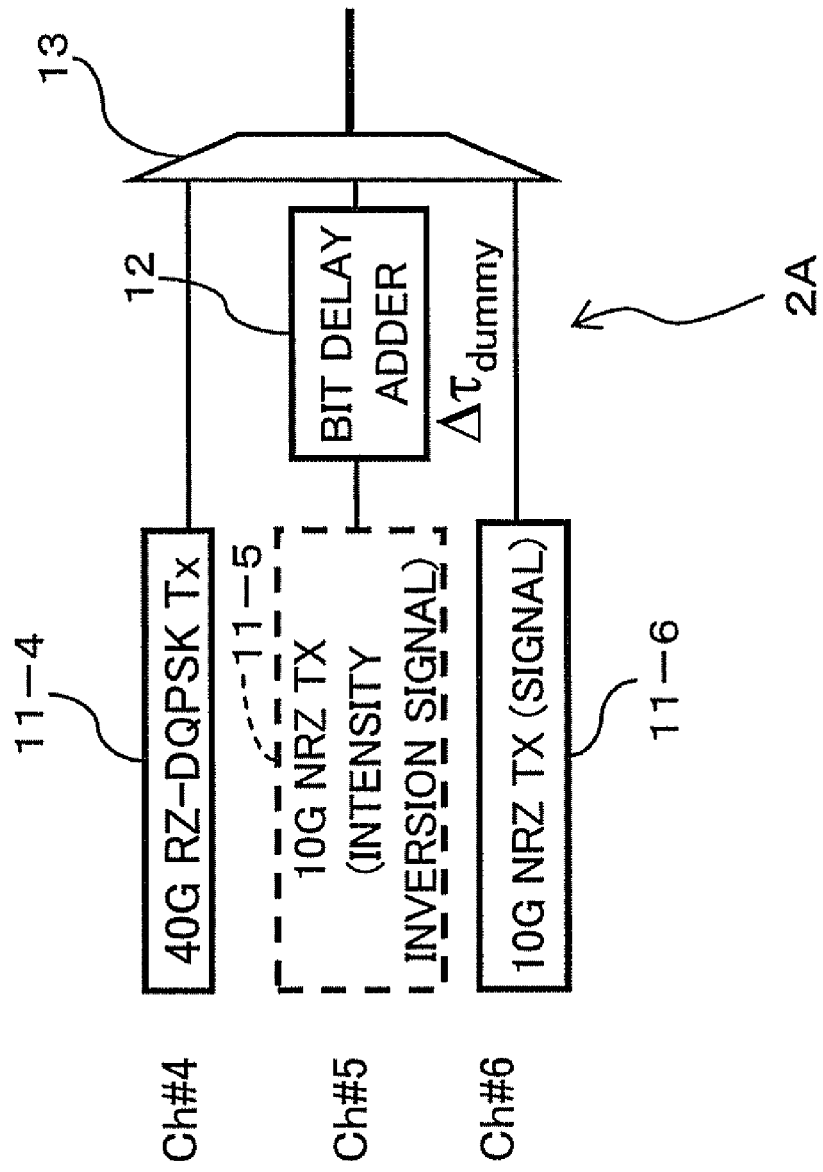
FIG. 10 is a diagram illustrating a modification of the embodiment.
Figure 11:
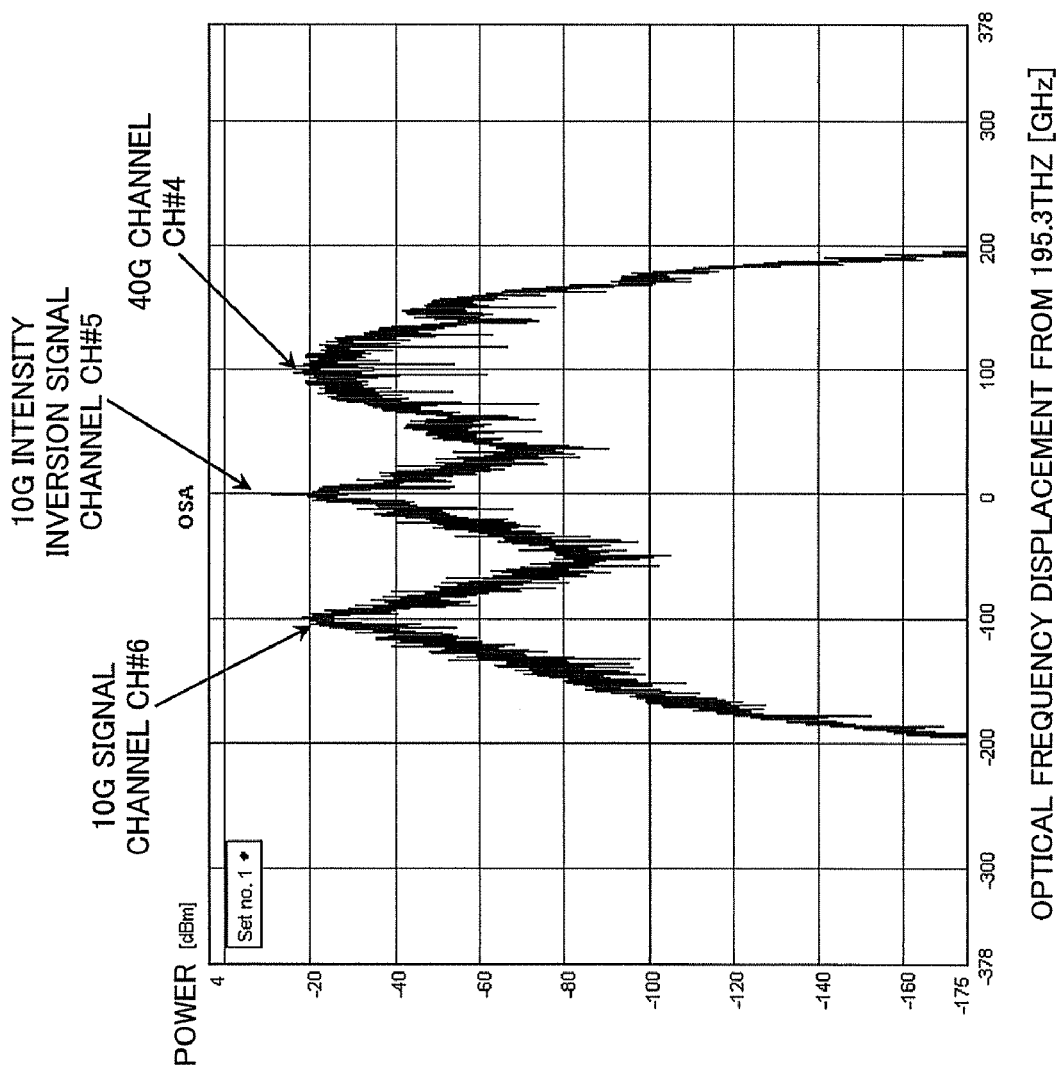
FIG. 11 is a diagram illustrating a result of transmission simulation by applying the intensity inversion signal light according to the modification in FIG. 10.
Figure 12:
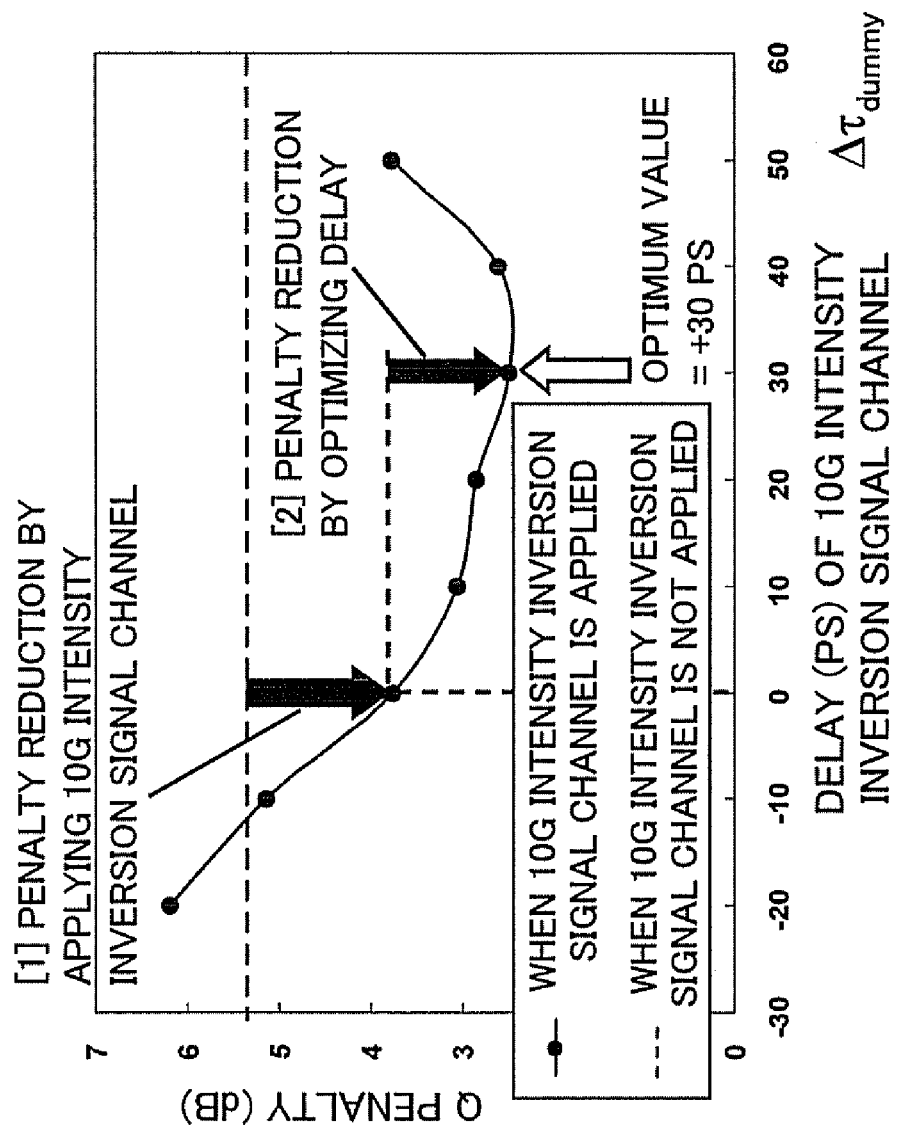
FIG. 12 is a diagram illustrating a result of transmission simulation by applying the intensity inversion signal light according to the modification in FIG. 10.
Figure 13:
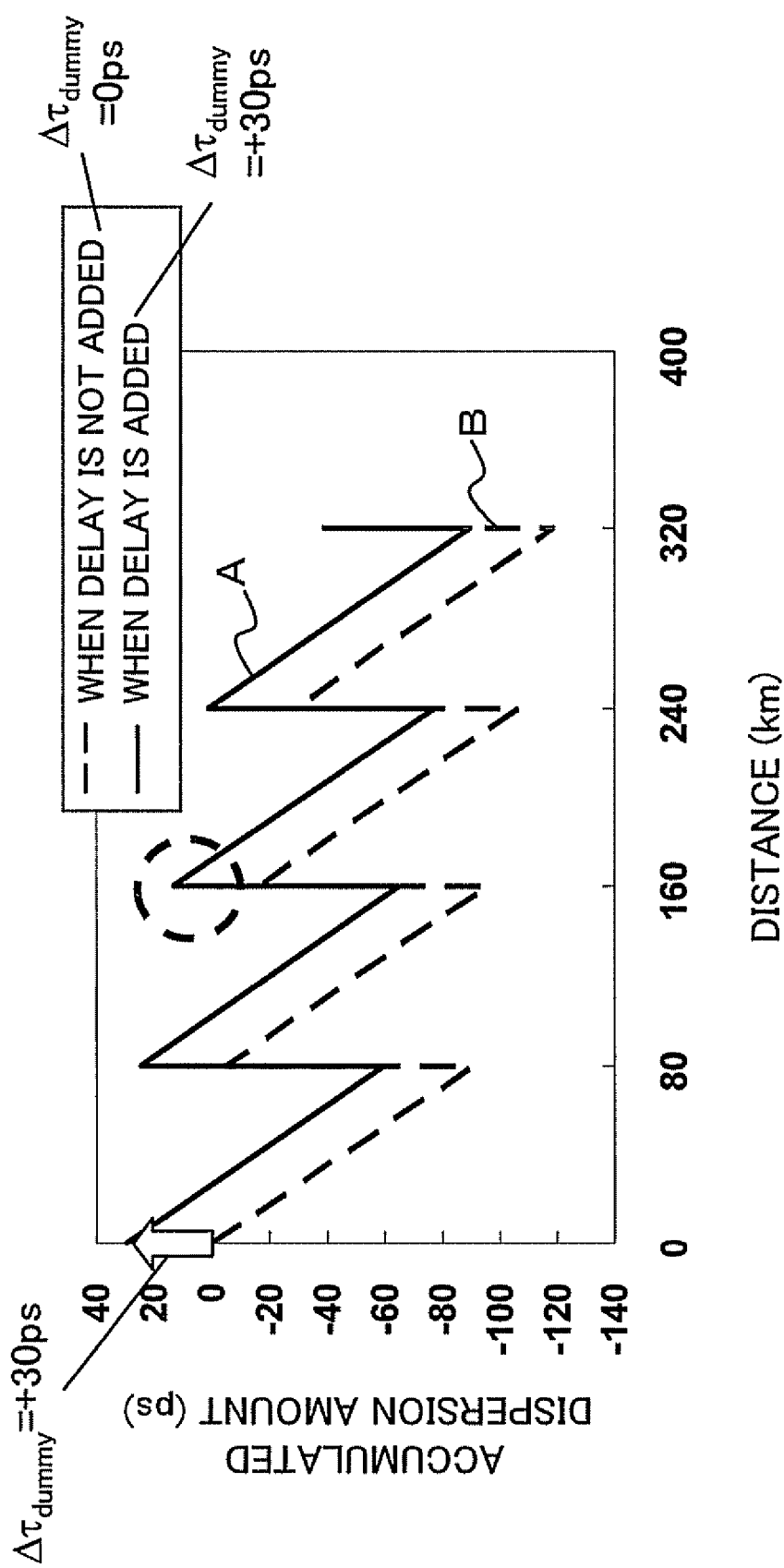
FIG. 13 is a diagram illustrating a result of transmission simulation by applying the intensity inversion signal light according to the modification in FIG. 10.

For example, when an optical transmitter 2A illustrated in FIG. 10 has channel light output units 11-4 to 11-6 outputting light having wavelengths A4 to A6 ($\lambda 4 < \lambda 5 < \lambda 6$), the channel light output unit (Ch#4) 11-4 may output a phase modulation optical signal similar to that in the case in FIG. 1, the channel light output unit (Ch#6) 11-6 may be a channel outputting an intensity modulation optical signal, and the channel light output unit (Ch#5) 11-5 may output an intensity inversion signal light whose code is the inversion of the code of the intensity modulation optical signal from the channel light output unit 11-6. In this case, it is possible to suppress deterioration of transmission quality of the phase modulation optical signal due to XPM. FIGS. 11 to 13 are diagrams illustrating a result of transmission simulation in the case of the above channel arrangement.

Owing to the channel light output units 11-4 to 11-6 illustrated in FIG. 10, an intensity modulation optical signal channel of 10 Gbps is positioned on the longer wavelength's side of a phase modulation optical signal (Ch#4) of 40 Gbps, and a channel (intensity inversion signal channel) outputting intensity inversion signal light of 10 Gbps is positioned at a channel (the neighboring channel Ch#5 in this embodiment) having a wavelength in the vicinity of the intensity modulation optical signal of 10 Gbps. FIG. 11 is a diagram illustrating a spectrum of wavelength-division-modulated signal light (transmission light) obtained by wavelength-division-multiplexing the light from the above-mentioned channel light output units 11-4 to 11-6.

FIG. 12 is a diagram illustrating a result of simulation of reception signal quality (Q penalty) of the phase modulation signal of 40 Gbps according to a delay amount added by the bit delay adder 12 when the wavelength-division-multiplexed signal light transmitted from the optical transmitter 2A is received by the optical receiver 4. As illustrated in FIG. 12, improvement of the signal quality in a certain degree is found within a range from 0 to 50 ps of the delay addition amount $\Delta\tau$dummy (see [1] in FIG. 12), particularly, the optimum signal quality is obtained when the delay addition amount $\Delta\tau$dummy is 30 ps (see [2] in FIG. 12).

In FIG. 13, A designates a dispersion map when the delay addition amount $\Delta\tau$dummy added to the intensity inversion signal light from the intensity inversion signal channel Ch#5 is 30 ps, whereas B designates a dispersion map when delay is not added ($\Delta\tau$dummy=0 ps) to the intensity inversion signal light from the intensity inversion signal channel Ch#3.

As illustrated at A in FIG. 13, delay $\Delta\tau$dummy corresponding to a compensation amount (30 ps) for −30 ps, which is one-half the difference (−60 ps) in propagation time between the intensity modulation optical signal in Ch#6 and the intensity inversion signal light in the intensity inversion signal channel Ch#5 in the optical transmission line 3 is added by the bit delay adder 12. At A in FIG. 13, a delay time (+30 ps) is added to the transmission end of the intensity inversion signal channel Ch#3 of 10 Gbps such that the bit delay from the signal channel Ch#2 of 10 Gbps coincides at almost the intermediate point of the transmission distance, thereby making Q penalty minimum.

Like the case illustrated in FIG. 1 (FIGS. 5 to 7) aforementioned, it is possible to efficiently cancel red chirp and blue chirp in the phase modulation optical signal caused by the intensity modulation optical signal of channel Ch#6.

In the aforementioned embodiment, the wavelength channel Ch#3 neighboring the wavelength channel Ch#2 for the intensity modulation optical signal is assigned as the intensity inversion signal light channel. However, this embodiment is not limited to this example. The intensity inversion signal light channel may be positioned in the vicinity of the wavelength channel Ch#2 for the intensity modulation optical signal so long as amount of the chirp given to the phase modulation optical signal by the intensity modulation optical signal can be reduced. For example, when the wavelength of the phase modulation optical signal is $\lambda 4$ of the channel #4, the intensity inversion signal light channel may be a channel Ch#1 (wavelength $\lambda 1$) positioned on the opposite side of the phase modulation optical signal in relation to a wavelength channel #2 (wavelength $\lambda 2$) of the intensity modulation optical signal, or may be a channel Ch#5 (wavelength $\lambda 1$) across the phase modulation optical signal in relation to the wavelength channel #3 (wavelength $\lambda 3$) of the intensity modulation optical signal.

The phase modulation signal is not limited to one channel, but may be set to a plurality of channels.

Figure 14:
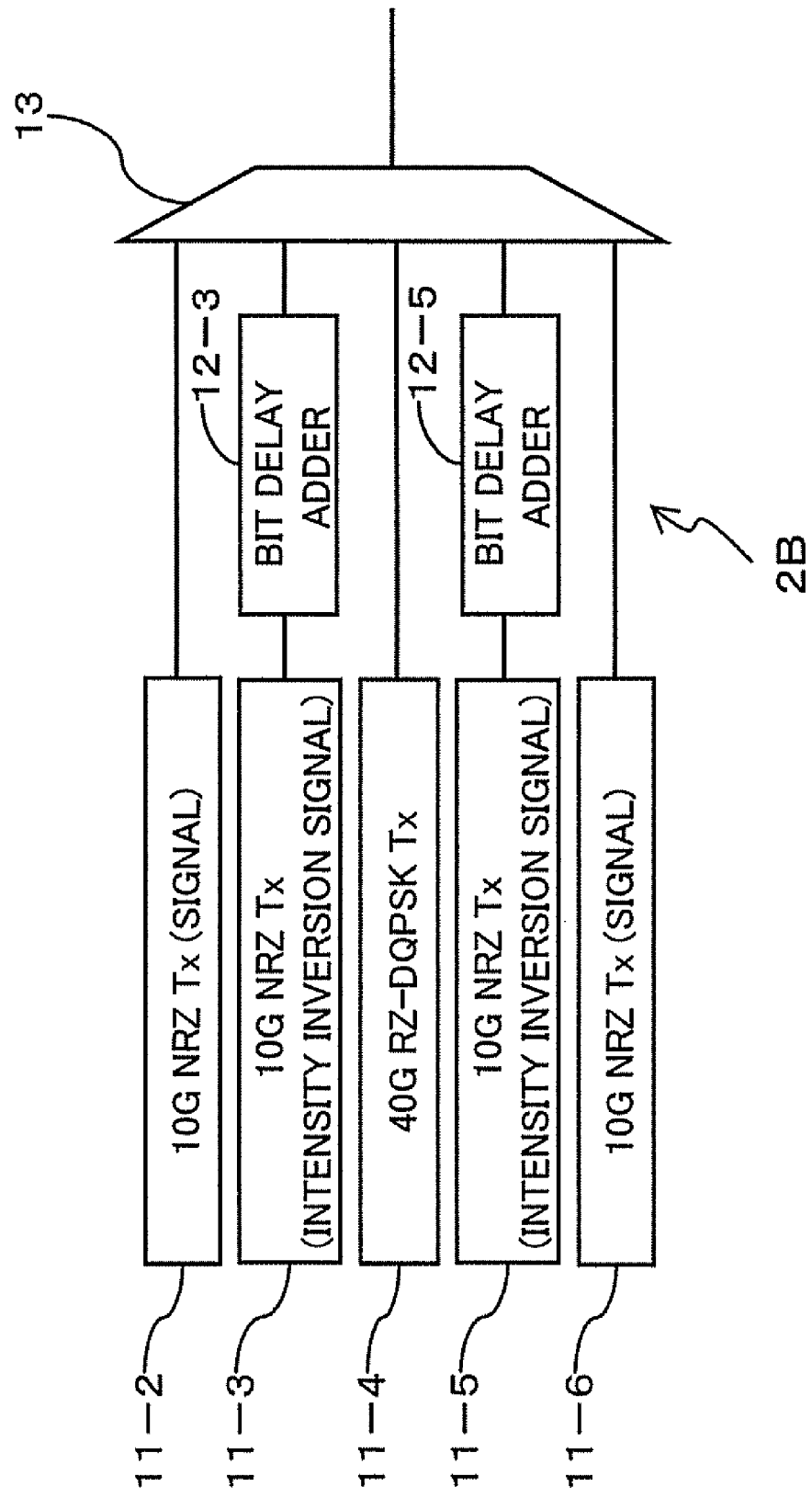
FIG. 14 is a diagram illustrating another modification of the embodiment.

Further, the intensity modulation optical signal is not limited to one channel, but may be set to a plurality of channels. In such case, there are provided, as illustrated in FIG. 14, for example, channel light output units 11-2 to 11-6, a wavelength division multiplexed optical signal output unit 13 and bit delay adders 12-3 and 12-5 as an optical transmitter 2B, the channel light output units 11-2 and 11-6 output intensity modulation optical signals, and the channel light output unit 11-4 outputs a phase modulation optical signal. Further, the channel light output units 11-3 and 11-5 output intensity inversion signal light (wavelength $\lambda 3$ and $\lambda 5$) having intensity patterns obtained by inverting intensity changes of the intensity modulation optical signals from the channel light output units 11-2 and 11-6, respectively.

Whereby, amounts of chirp due to XPM given to the phase modulation signals by the intensity modulation optical signals from the channel light output units 11-2 and 11-6, which function as intensity modulation optical signal sources, can be cancelled by amounts of chirp due to XPM given to the phase modulation optical signal by the intensity inversion signal light from the channel light output units 11-3 and 11-5, thereby to attain excellent reception signal quality of the phase modulation optical signal.

When a plurality of channel light output units are provided as the intensity modulation optical signal sources, it is necessary only to set an intensity inversion signal light channel, as the channel light output unit configuring the intensity inversion signal light output unit, for at least an intensity modulation optical signal having a light wavelength that can have an affect on the transmission quality of the phase modulation optical signal due to cross phase modulation among the plural intensity modulation optical signals, in order to output intensity inversion signal light. In other words, when a difference in propagation velocity due to dispersion produced between the intensity modulation optical signal and the phase modulation optical signal is sufficiently large and walkoff between the wavelengths is sufficiently large, there is no need to set an intensity inversion signal light channel corresponding to the channel light output unit as the intensity modulation optical signal source.

Figure 15:
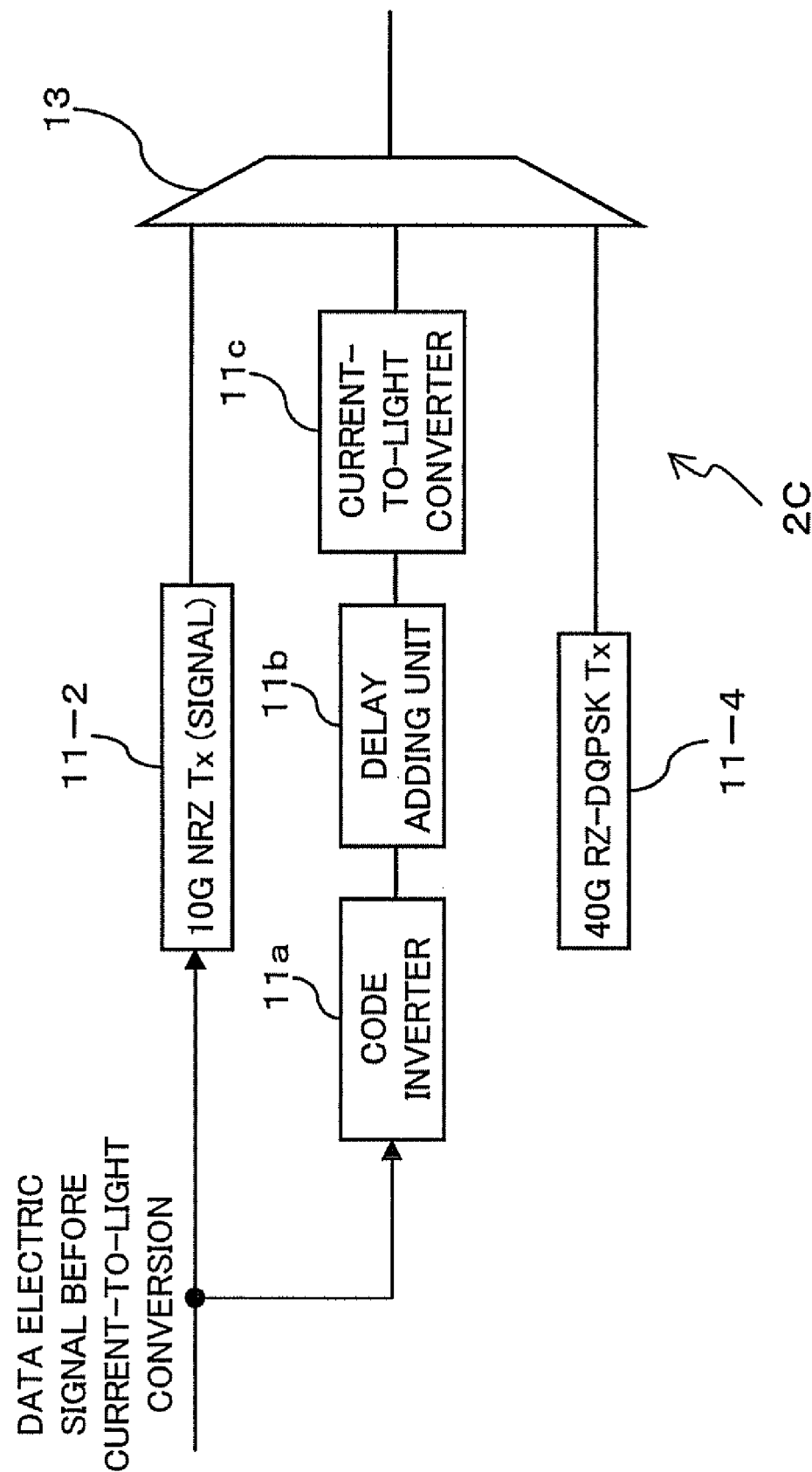
FIG. 15 is a diagram illustrating still another modification of the embodiment.
Figure 16A:
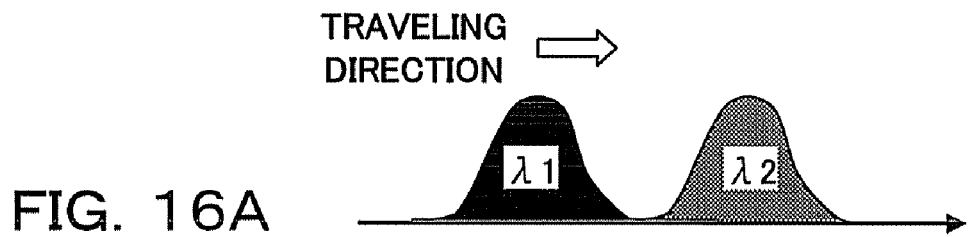
FIGS. 16A to 16C are conceptual diagrams illustrating a phenomenon of cross phase modulation by optical pulses.
Figure 16B:
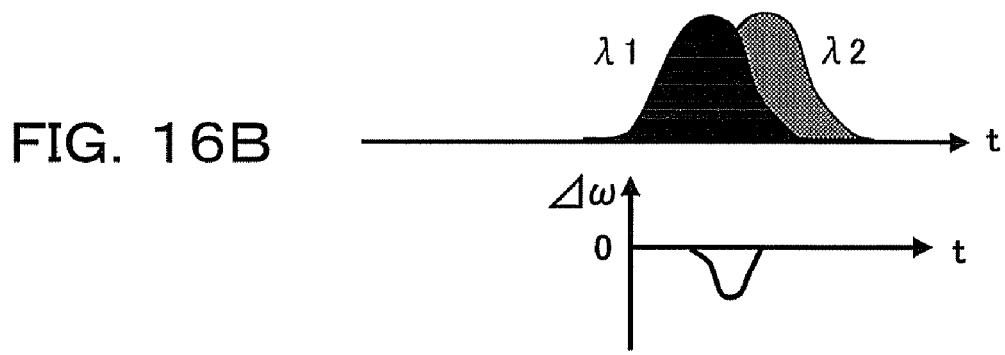
Figure 16C:
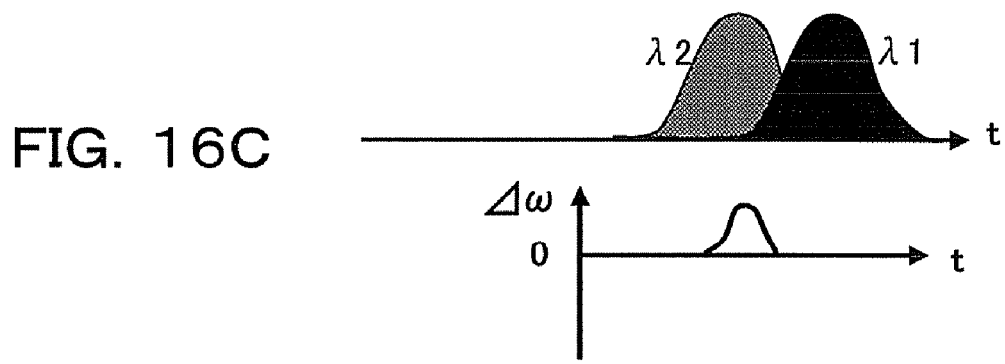
Figure 17:
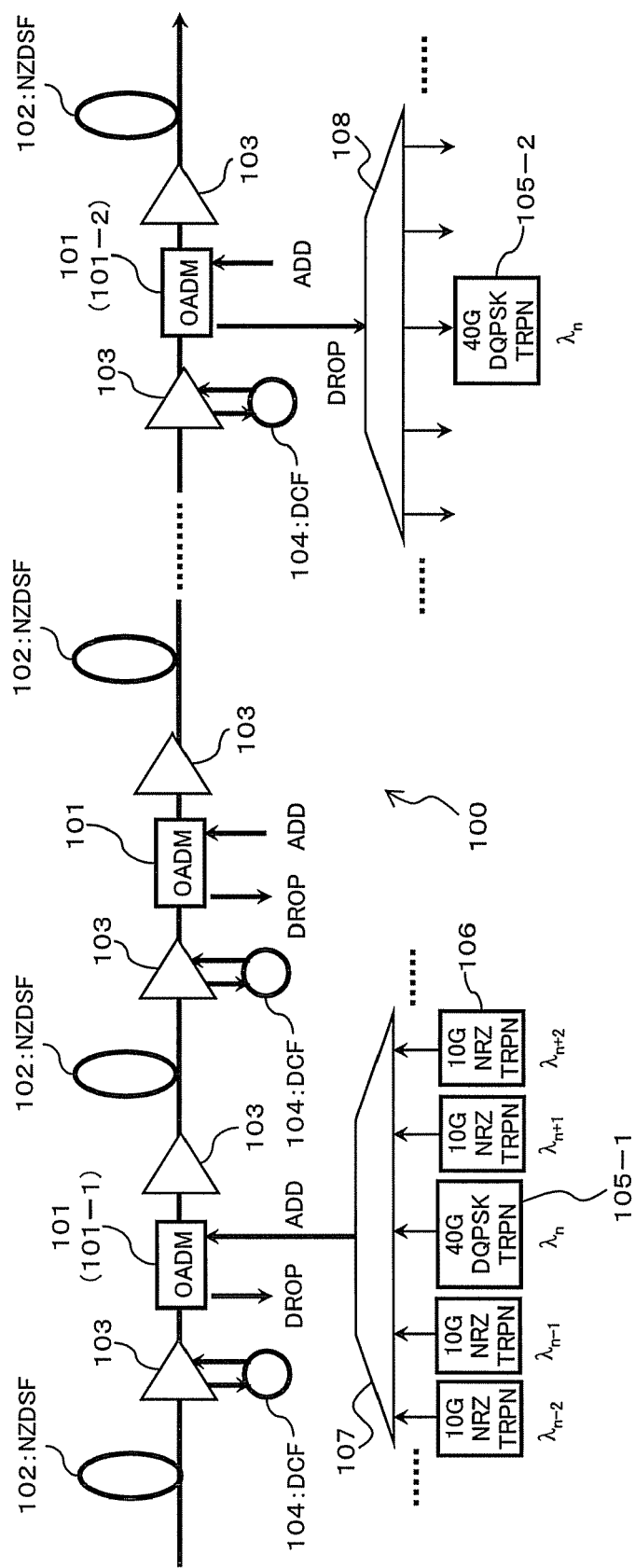
FIG. 17 is a diagram illustrating an example of wavelength division multiplexing transmission system in which a phase modulation signal and an intensity modulation signal exist in a mixed form.
Figure 18:
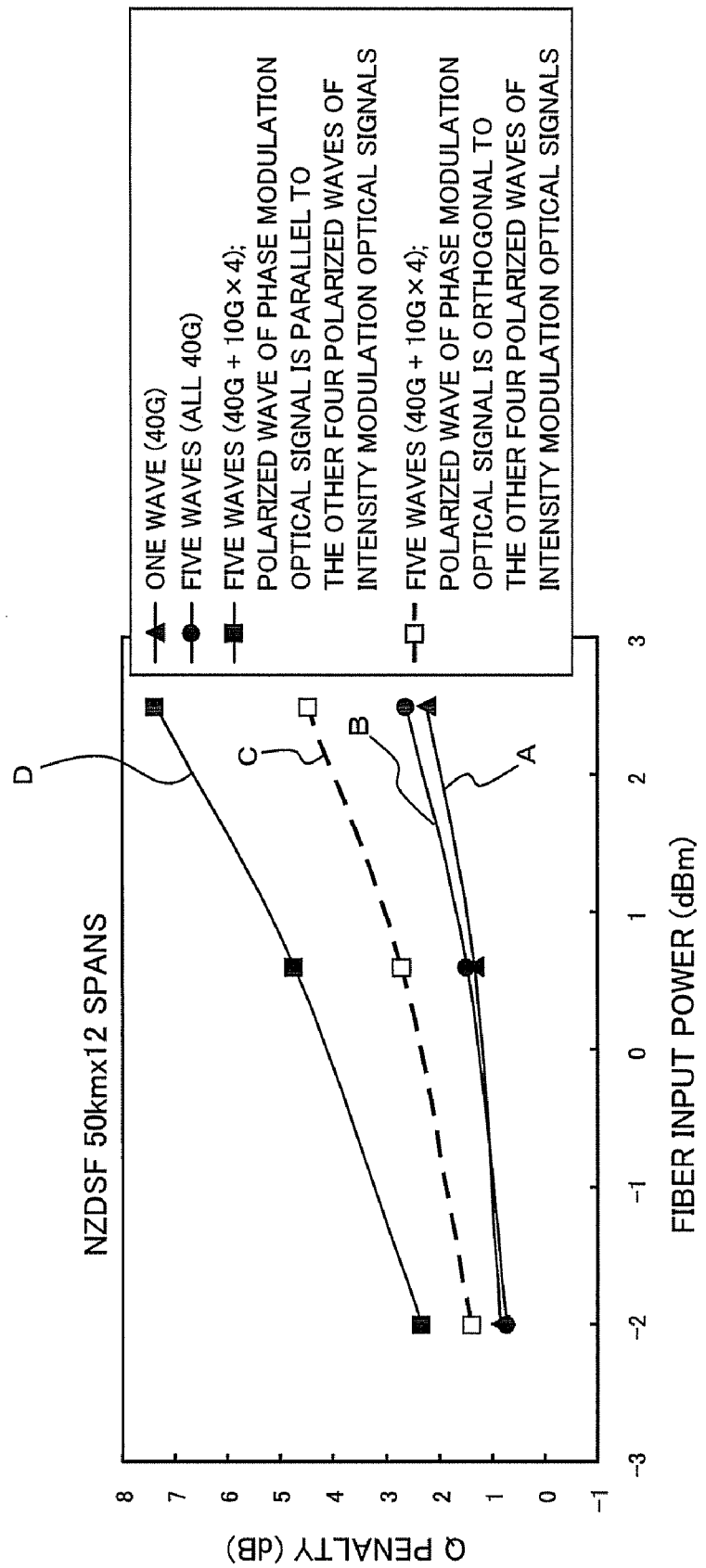
FIG. 18 is a diagram illustrating an issue to be solved by the embodiments.

In the aforementioned embodiment, a delay time according to a difference in propagation delay time in the optical transmission line 3 between the intensity inversion signal light generated by the channel light output unit 11-3 and the intensity modulation optical signal is added to the intensity inversion signal light. According to this embodiment, a signal obtained by adding the above delay time in the level of electric signal may be converted from current to light to generate the intensity inversion signal light. In such case, an optical transmitter 2C has, as illustrated in FIG. 15, a code inverter 11a which inverts a code of a data electric signal before converted into an optical signal to be outputted as the intensity modulation optical signal in Ch#2 as the intensity inversion signal light output unit, a delay adding unit 11b similar to the aforementioned bit delay adder 12 which gives a delay time to the electric signal fed from the code inverter 11a, and a current-to-light converter 11c which converts the electric signal from the delay adder 11a into light having a wavelength λ3 (for example, intensity inversion signal light NRZ-intensity-modulated).

In this case, the code inverter 11a and the delay adding unit lib together configure a timing adjusting unit which inverts an electric signal corresponding to an intensity pattern of the intensity modulation optical signal, and adjusts the timing on the basis of a difference in propagation time between the intensity inversion signal light and the intensity modulation optical signal due to light propagation over the optical transmission line 3. Further, a time corresponding to substantially one-half the difference in propagation time is added in the timing adjustment in the similar manner to the aforementioned embodiment, thereby to suppress a chirp amount generated in the phase modulation optical signal, most suitably. Like the channel light output unit 11-2, the current-to-light converter 11c has a function of being able to output light obtained by NRZ-intensity-modulating an input electric signal, which configures an intensity inversion signal light generating unit.

In the aforementioned embodiment, NRZ intensity modulation scheme is employed as the modulation scheme for the intensity modulation optical signal, while RZ-DQPSK is employed as the modulation scheme for the phase modulation optical signal. However, this embodiment is not limited to this example, but another known intensity modulation scheme and phase modulation scheme may be employed so long as the schemes can transmit signals in which an intensity modulation optical signal and a phase modulation optical signal exist in a mixed form. Further, the mode of bit rate is not limited to that in the aforementioned embodiment, but the intensity modulation optical signal and the phase modulation optical signal may have the same bit rate, or the intensity modulation optical signal may have a higher bit rate than the phase modulation optical signal.

In the aforementioned embodiment, the NZDSFs 3a-1 to 3a-4 are employed as the optical transmission line. However, this embodiment is not limited to this example, but an optical transmission line such as DSF or the like assumed to be affected by XPM between channels when a wavelength division multiplexed optical signal of at least a phase modulation optical signal and an intensity modulation optical signal is transmitted may be employed, as a matter of course.

[B] Others

Not limited to the above embodiment, the embodiments may be modified in various ways and implemented.

Disclosure of the above embodiment allows a person skilled in the art to manufacture the apparatus according to these embodiments.

As stated above, the embodiments can advantageously suppress deterioration of transmission quality due to XPM in a wavelength division multiplexing optical communication system in which an intensity modulation optical signal and a phase modulation optical signal exist in a mixed form.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. An optical transmission apparatus transmitting a wavelength division multiplexed optical signal of an intensity modulation optical signal and a phase modulation optical signal through an optical transmission line, comprising:
   an intensity inversion signal light output unit that outputs light having an intensity pattern obtained by inverting intensity changes of the intensity modulation optical signal near a wavelength of the intensity modulation optical signal in arrangement on wavelength axis of optical wavelengths that can be multiplexed as the wavelength division multiplexed optical signal; and
   a wavelength division multiplexed optical signal output unit that wavelength-division-multiplexes the intensity modulation optical signal, the phase modulation optical signal and light from the intensity inversion signal light output unit and outputs a wavelength-division-multiplexed optical signal that the intensity modulation optical signal, the phase modulation optical signal and the light from the intensity inversion signal light output unit are wavelength-division-multiplexed.

2. The optical transmission apparatus according to claim 1 further comprising:
   an intensity modulation optical signal output unit that outputs the intensity modulation optical signal; and
   a phase modulation optical signal output unit that outputs the phase modulation optical signal through an optical wavelength differing from an optical wavelength of the intensity modulation optical signal;
   wherein, the intensity inversion signal light outputted from the intensity inversion signal light output unit has an optical wavelength positioned near the intensity modulation optical signal on the wavelength axis as an optical wavelength for the intensity inversion signal light.

3. The optical transmission apparatus according to claim 1, wherein the intensity inversion signal light output unit comprises:
an intensity inversion signal light generating unit that generates intensity inversion signal light having the optical wavelength for the intensity inversion signal light and the intensity pattern; and
a timing adjusting unit that performs output timing adjustment of light from the intensity inversion signal light generating unit based on a difference in propagation time between the light and the intensity modulation optical signal due to optical propagation over the optical transmission line.

4. The optical transmission apparatus according to claim 3, wherein the timing adjusting unit performs the timing adjustment so that the intensity inversion signal light outputted from the intensity inversion signal light generating unit undergoes timing adjustment corresponding to substantially one-half the difference in propagation time.

5. The optical transmission apparatus according to claim 1, wherein the intensity inversion signal light output unit comprises:
a timing adjusting unit that inverts an electric signal corresponding to the intensity pattern of the intensity modulation optical signal and performs timing adjustment based on a difference in propagation time between the intensity inversion signal light and the intensity modulation optical signal due to optical propagation over the optical transmission line; and
an intensity inversion signal light generating unit that generates the intensity inversion signal light based on the electric signal from the timing adjusting unit.

6. The optical transmission apparatus according to claim 1, wherein the intensity modulation optical signal output unit has a plurality of intensity modulation optical signal sources that generate intensity modulation optical signals for respective optical wavelengths which are a unit to be multiplexed as the wavelength division multiplexed optical signal; and
the intensity inversion signal light output unit outputs intensity inversion signal light for an intensity modulation optical signal having an optical wavelength having an effect on transmission quality of the phase modulation signal due to cross phase modulation among the plural intensity modulation optical signals outputted from the plural intensity modulation optical signal sources.

7. An optical transmission apparatus transmitting a wavelength division multiplexed optical signal of an intensity modulation optical signal and a phase modulation optical signal through an optical transmission line comprising a non-zero dispersion-shifted single mode optical fiber or a dispersion-shifted optical fiber, comprising:
an intensity inversion signal light output unit that outputs light having an optical wavelength for an intensity inversion signal light at which the intensity modulation optical signal and the phase modulation optical signal are not positioned and near the intensity modulation optical signal on wavelength axis of optical wavelengths that can be multiplexed as the wavelength division multiplexed optical signal, and having an intensity pattern obtained by inverting intensity changes of the intensity modulation optical signal; and
a wavelength division multiplexed optical signal output unit that wavelength-division-multiplexes the intensity modulation optical signal, the phase modulation optical signal and light from the intensity inversion signal light output unit and outputs a wavelength-division multiplexed signal that the intensity modulation optical signal, the phase modulation optical signal and the light from the intensity inversion signal light output unit are wavelength-division-multiplexed.

8. A wavelength division multiplexing optical communication system having an optical transmitter being able to transmit a wavelength division multiplexed optical signal of an intensity modulation optical signal and a phase modulation optical signal, an optical transmission line being able to transmit the wavelength division multiplexed optical signal transmitted from the optical transmitter, and an optical receiver being able to receive the wavelength division multiplexed optical signal from the optical transmission line, the wavelength division multiplexing optical communication system comprising:
the optical transmitter comprising:
an intensity inversion signal light output unit that outputs light having an intensity pattern obtained by inverting intensity changes of the intensity modulation optical signal near a wavelength of the intensity modulation optical signal in arrangement on wavelength axis of optical wavelengths that can be multiplexed as the wavelength division multiplexed optical signal as intensity inversion signal light; and
a wavelength division multiplexed optical signal output unit that wavelength-division-multiplexes the intensity modulation optical signal, the phase modulation optical signal and the light from the intensity inversion signal light output section and outputs a wavelength-division-multiplexed optical signal that the intensity modulation optical signal, the phase modulation optical signal and the light from the intensity inversion signal light output unit are wavelength-division-multiplexed; and
the optical receiver comprising:
a reception processing unit that performs reception processing on an optical signal set as a reception wavelength among optical signals wavelength-division-multiplexed in the wavelength division multiplexed optical signal.

9. The wavelength division multiplexing optical communication system according to claim 8, wherein the optical transmission line comprises a non-zero dispersion-shifted single mode optical fiber or a dispersion-shifted optical fiber.

10. An optical transmission method for transmitting a wavelength division multiplexed optical signal of an intensity modulation optical signal and a phase modulation optical signal through an optical transmission line, comprising:
outputting light having an intensity pattern obtained by inverting intensity changes of the intensity modulation optical signal near a wavelength of the intensity modulation optical signal in arrangement on wavelength axis of optical wavelengths that can be multiplexed as the wavelength division multiplexed optical signal as an intensity inversion signal light; and
wavelength-division-multiplexing the intensity modulation optical signal, the phase modulation optical signal and the intensity inversion signal light and outputting a wavelength-division-multiplexed optical signal that the intensity modulation optical signal, the phase modulation optical signal and the light from the intensity inversion signal light output unit are wavelength-division-multiplexed.

* * * * *